US006917373B2

(12) United States Patent
Vong et al.

(10) Patent No.: US 6,917,373 B2
(45) Date of Patent: Jul. 12, 2005

(54) CONTEXT SENSITIVE LABELS FOR AN ELECTRONIC DEVICE

(75) Inventors: William H. Vong, Seattle, WA (US); Corinne Broom, Seattle, WA (US); Steven T. Kaneko, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 693 days.

(21) Appl. No.: 09/749,445

(22) Filed: Dec. 28, 2000

(65) Prior Publication Data

US 2002/0085045 A1 Jul. 4, 2002

(51) Int. Cl.⁷ .............................................. G06K 15/00
(52) U.S. Cl. ...................................... 345/840; 345/805
(58) Field of Search ................................ 345/840, 841, 345/842–843, 853–855, 771–773, 835–839, 802, 765, 767, 732, 790–799, 800, 805, 726, 718–723

(56) References Cited

U.S. PATENT DOCUMENTS

| | | | |
|---|---|---|---|
| 5,208,745 A | | 5/1993 | Quentin et al. |
| 5,555,157 A | * | 9/1996 | Moller et al. ............... 361/683 |
| 5,727,155 A | | 3/1998 | Dawson |
| 5,762,553 A | | 6/1998 | Takasugi et al. |
| 5,818,361 A | | 10/1998 | Acevedo |
| 5,844,553 A | | 12/1998 | Hao et al. |
| 5,933,822 A | | 8/1999 | Braden-Harder et al. |
| 5,945,897 A | * | 8/1999 | Pluymers et al. ........... 333/244 |
| 5,959,630 A | | 9/1999 | Takeuchi et al. |
| 5,999,169 A | | 12/1999 | Lee |
| 6,112,141 A | | 8/2000 | Briffe et al. .................. 701/14 |
| 6,112,215 A | | 8/2000 | Kaply |
| 6,126,328 A | | 10/2000 | Mallory et al. |
| 6,191,758 B1 | | 2/2001 | Lee |
| 6,215,474 B1 | | 4/2001 | Shah |
| 6,219,027 B1 | | 4/2001 | Shimizu et al. |
| 6,226,640 B1 | | 5/2001 | Ostrovsky et al. |
| 6,317,141 B1 | | 11/2001 | Pavley et al. ............... 345/732 |

(Continued)

FOREIGN PATENT DOCUMENTS

GB        2241474 A        9/1991

OTHER PUBLICATIONS

Screen–print of Corel WordPerfect 8 Tools/Settings/Display dialogue box, ©1997.
Sony Vaio MX Desktop Entertainment, On–line Product Brochure for Models PCV–MX2L5, MX2TV7 and MX2V7, Sony Marketing (Japan) Inc., Copyright 2000 (printed Oct. 27, 2000 from http://www.sony.co.jp/ProductsPark/Consumer/PCOM/PCV–MX2).
Toshiba Infinia 7130, Product Specifications and photographs of product, Toshiba America Information Systems Inc., Apr. 4, 2000.

Primary Examiner—Steven Sax
(74) Attorney, Agent, or Firm—Banner & Witcoff, Ltd.

(57) ABSTRACT

A control panel unit for a computing device includes buttons having characteristics that define individual button states. Upon actuation of a button, the viewable states of the buttons may change. A portion of the button may be illuminated to represent the state and/or include an icon depicting an application controlled by the button. The control panel unit may include a display for displaying plural soft labels corresponding to the buttons and representing the current context that will be initiated when the corresponding button is actuated. The soft labels may identify users or applications available to one user. Upon actuation of an application, the soft labels can change to represent various actions or functions available in the application. In the user interface, each user may be assigned a specific color scheme. The color schemes allow a person to visually determine who is logged into the system and/or which individual has new information.

57 Claims, 21 Drawing Sheets

U.S. PATENT DOCUMENTS

| | | |
|---|---|---|
| 6,337,698 B1 | 1/2002 | Keely et al. ................. 345/823 |
| 6,341,305 B2 | 1/2002 | Wolfe |
| 6,381,519 B1 | 4/2002 | Snyder .......................... 701/3 |
| 6,390,371 B1 | 5/2002 | Armga et al. |
| 6,431,716 B1 | 8/2002 | Kusakabe |
| 6,438,282 B1 | 8/2002 | Takeda et al. |
| 6,438,619 B1 | 8/2002 | Coman |
| 6,446,111 B1 | 9/2002 | Lowery |
| 6,484,189 B1 * | 11/2002 | Gerlach et al. .............. 345/730 |
| 6,504,575 B1 | 1/2003 | Ramirez et al. ....... 348/333.02 |
| 6,512,529 B1 | 1/2003 | Janssen et al. |
| 6,522,309 B1 | 2/2003 | Weber |
| 6,624,831 B1 * | 9/2003 | Shahine et al. ............. 345/815 |
| 6,661,435 B2 * | 12/2003 | Nason et al. ................ 345/778 |
| 6,686,936 B1 * | 2/2004 | Nason et al. ................ 345/778 |

* cited by examiner

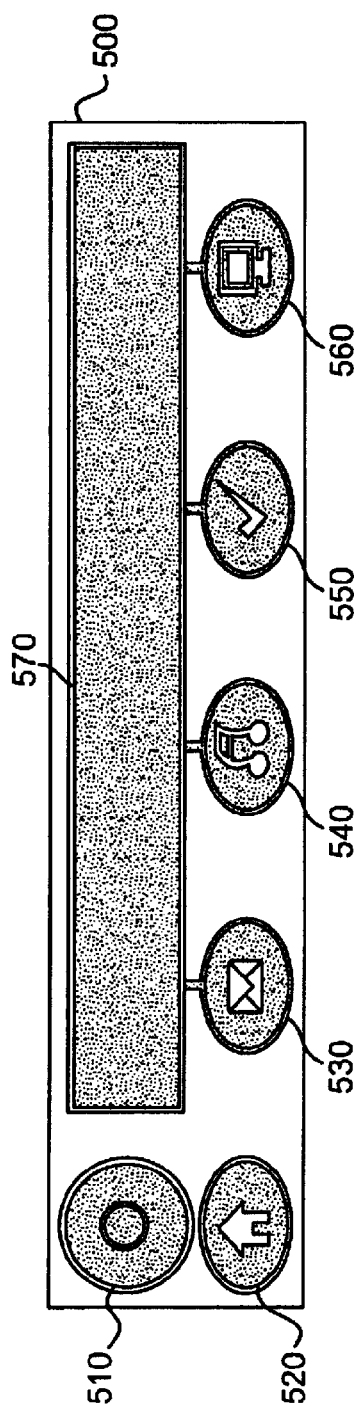
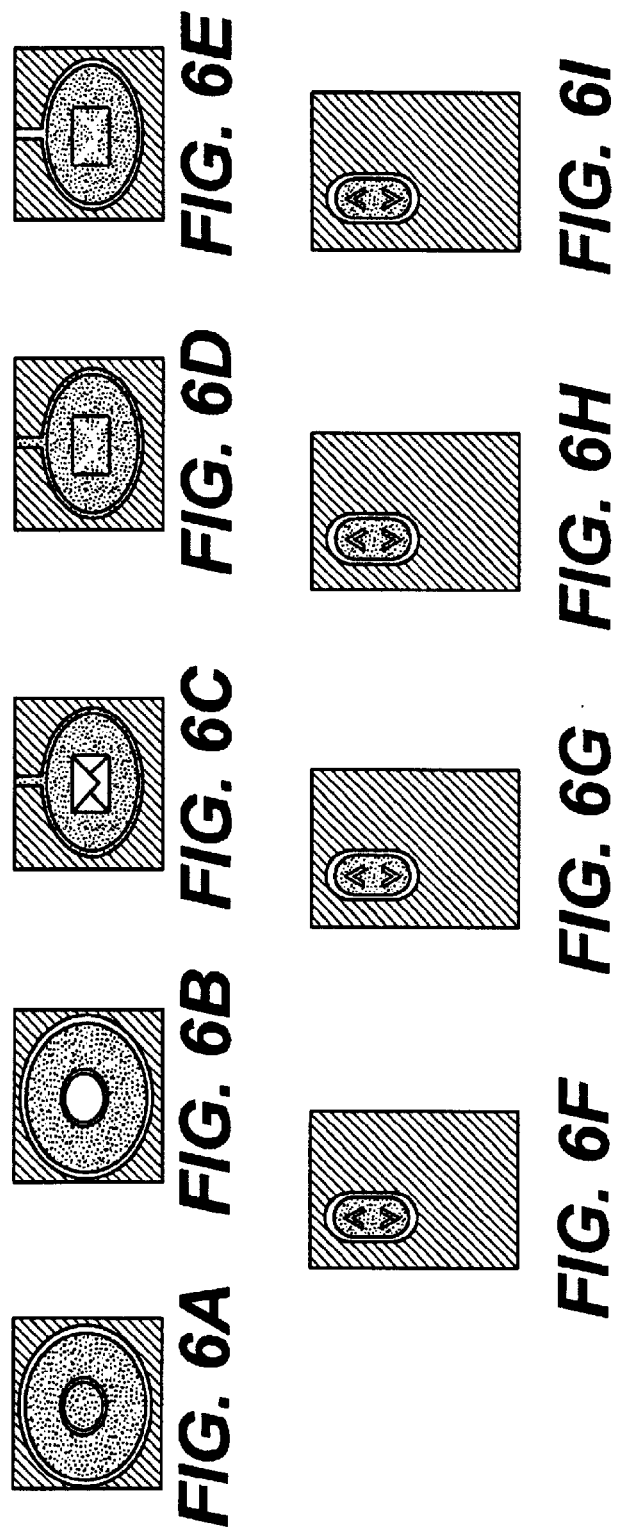

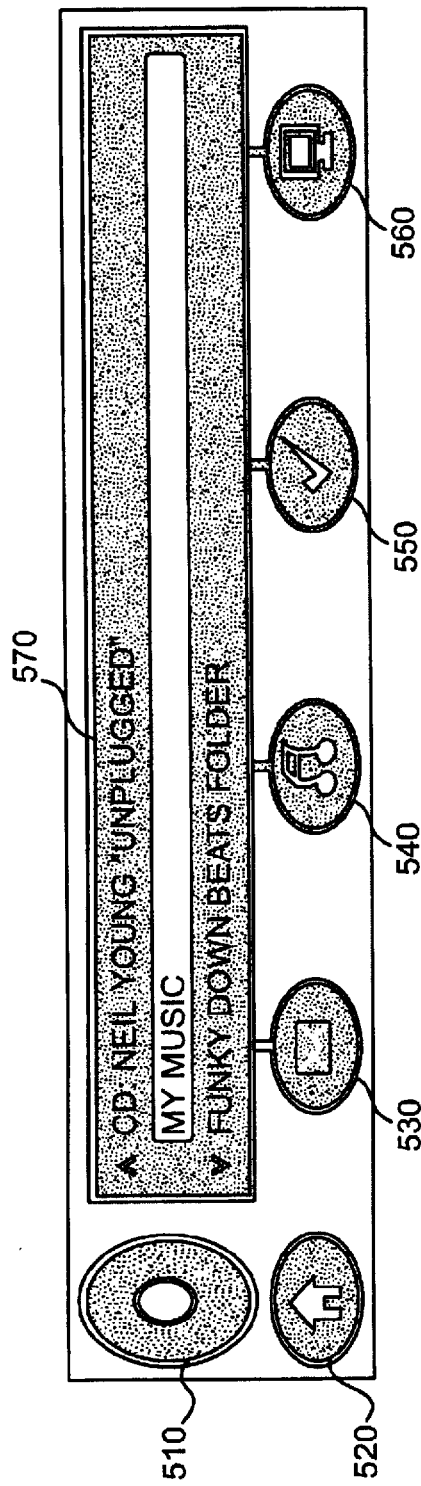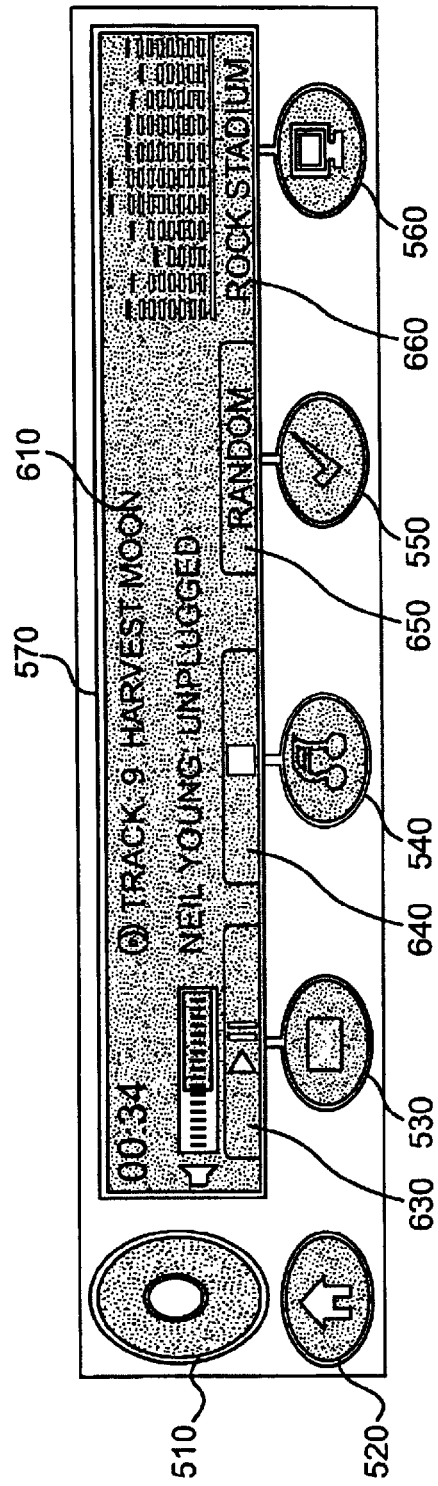

HOME
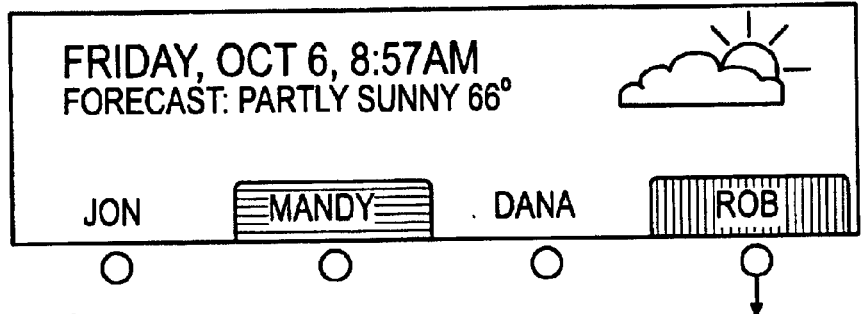
USER STATUS
CALENDAR
DAY VIEW
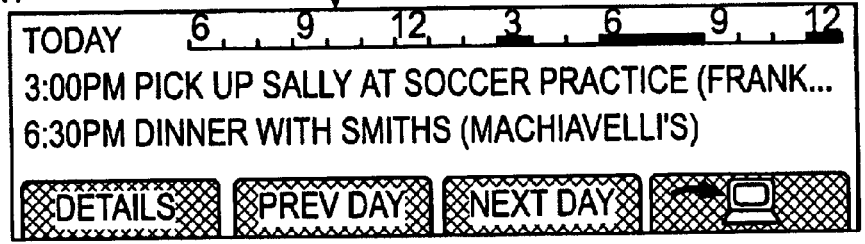
SHOW DAY VIEW OF NEXT/PREV DAY.
(SUBSTITUTE DATE FOR "TODAY" AND
UPDATE FREE/BUSY DISPLAY AND APPTS
FOR THAT DAY).
APPT DETAIL
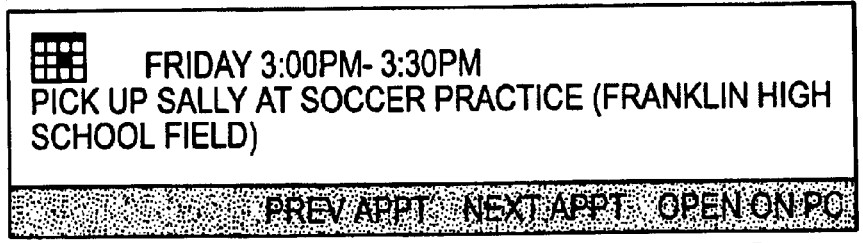
SHOW APPT DETAILS OF NEXT/PREV APPT
FIG. 13B

FIG. 13C CONT. 1

NEW EMAIL (ALERT)

```
NEW EMAIL HAS ARRIVED.
✉ WOULD YOU LIKE TO
   READ IT NOW?
YES    NO                    30 ⏰
 O      O
```

BUDDY LIST

```
▽  👤 MARGE (MSIMPSON@HOTMAIL.COM)
   👤 SALLY (SALGIRL@PASSPORT.COM)
   👤 SAM (STE445@HOTMAIL.COM)
   ▓▓ VOICE CHAT ▓▓
    O    O    O    O
```

CONT. FROM 13C →

EMAIL ALOUD

```
✉ WILLIAM HARTMAN 9/30/00 5:12PM
NEW MEMBER OF THE JONES FAMILY
PLEASE WELCOME THE LITTLEST JONES! SARAH AND
[▐▌]  [■]  [▶]
 O     O    O         O
```

CONT. FROM 13C →

PLAY/PAUSE TOGGLE

STOPS PLAY (PLAY WOULD RESUME AT BEGINNING OF MESSAGE IF RESTARTED)

GOES TO NEXT MESSAGE IN EMAIL ALOUD FORMAT

IF USER DOES NOTHING THEN AT END OF FIRST MESSAGE, IT WILL STOP AND BEGIN NEXT MESSAGE (SCREEN UPDATES TO NEW MESSAGE INFO, AUDIO SAYS "NEXT MESSAGE" BEFORE STARTING TO READ). AT END OF READING ALL MESSAGES, AUDIO SAYS "END OF MESSAGES" AND SCREEN RETURNS TO EMAIL LIST VIEW.

← CONTINUED

CHAT ACCEPT (ALERT)
↓ TALK ↓ CANCEL → RETURN TO PREVIOUS SCREEN
VOICE CHAT ↓
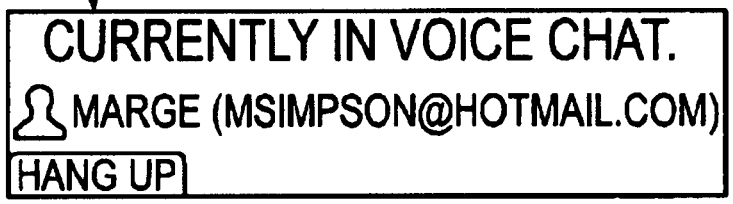
↓ RETURN TO PREVIOUS SCREEN
CHAT ALERT
↓ OPEN VOICE CHAT ↓ RETURN TO PREVIOUS SCREEN
*FIG. 13C CONT. 2*

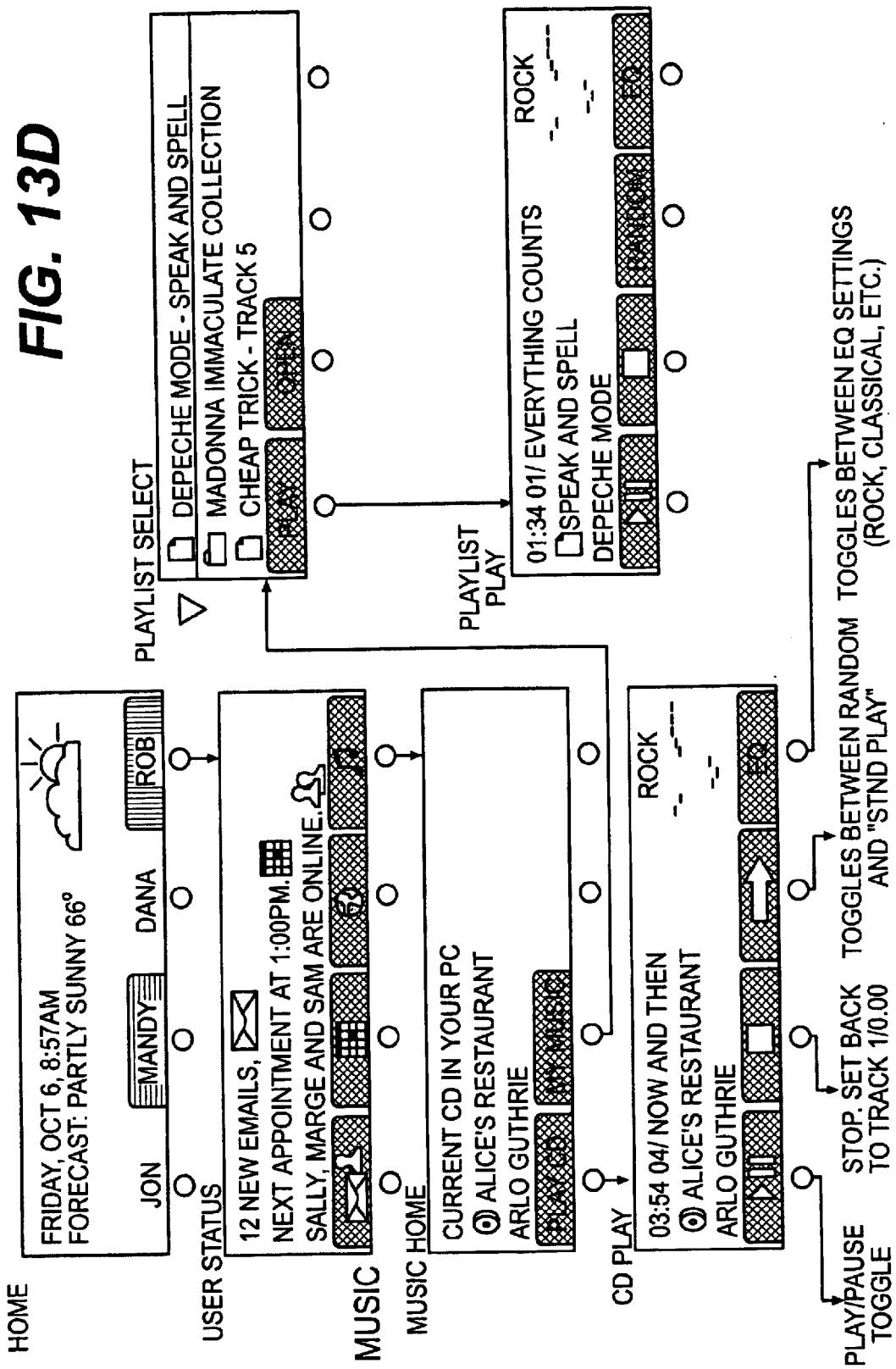

CONTEXT SENSITIVE LABELS FOR AN ELECTRONIC DEVICE

I. BACKGROUND OF THE INVENTION

A. Technical Field

The disclosure generally relates to employing a dynamic user interface for an electronic device. More particularly, the disclosure relates to the use of context sensitive soft labels and button states to provide a user interface that allows a user to navigate through a series of functions associated with an electronic device.

B. Related Art

In conventional computer systems, a single monitor or other type of display unit is connected to a system bus via an interface, such as a video adapter. The system bus couples the monitor to the central processing unit (CPU) of the host computer. The host computer executes instructions requesting that information be retrieved from system memory and sent over the system bus to the display monitor for display.

One known system provides a computer network having a common CPU that can be shared among multiple display terminals and keyboards. In this system, the display terminals are dumb terminals under the control of the CPU. Such a system is typically set up for multiple independent users. The advantage of such a system is that the CPU can be centrally located out of sight and away from each of the user's terminals. Thus, space can be freed up at a user's workstation. Another advantage is that all the applications can be stored in a single location rather than having to be installed separately for each user.

With the advent of smart home environments, it is not feasible to place traditional computer terminals including large monitors and keyboards at multiple locations around a home. Traditional computer terminals require a significant amount of space, which is typically not available in most locations throughout a home. Thus, smaller control panel units including auxiliary displays are needed to facilitate the implementation of smart homes.

Existing control panel units are designed for systems with limited functionality such as stereos, telephones and the like. The user interfaces for these devices typically have several buttons and a display panel with each button being dedicated to one function. For example, with a radio, one button may be dedicated to volume control and another to tuning. To provide rich and robust functionality for multiple applications that will be employed in smart homes, existing control panel units require additional buttons. With an increase in the number of buttons, control panel real estate expands such that the size of the control panel unit approaches the size of a traditional computer terminal. Further, operation can become overwhelming from a user friendliness perspective with a substantial number of buttons. Such control panel units are unwieldy for the home environment where space is at a premium. Consequently, there is a need in the art to increase the functionality available in a control panel unit to approach the richness and robustness of a traditional computer terminal while providing a feasibly sized control panel unit.

II. SUMMARY OF THE INVENTION

The present invention overcomes many of the shortcomings of existing control panel units by providing a control panel unit with a display that can be located throughout the home to allow users to control multiple devices and activate multiple applications from multiple locations. Aspects of the invention include providing context sensitive characteristics for a user interface for an electronic device. The context sensitive characteristics can take the form of viewable states of button inputs on a control panel unit and/or soft labels on a display portion of the control panel unit. The viewable states on the button inputs may include icons and/or illuminable regions on the buttons.

The present invention is directed to a control panel unit for a computer system having button inputs with viewable states thereon and/or soft labels on a display, which represent the context of the button inputs. In response to actuation of one of the button inputs, the viewable states and soft labels can change.

In another aspect of the invention, a display unit may be integrated with the control panel unit. The display unit may include separate display regions including display regions displaying context sensitive soft labels corresponding to respective button inputs and a main display region for displaying data. One of the advantages of the soft labels is that they allow a user to know the functionality of a button input prior to actuation. Further, each time a button is actuated, some of the buttons may take on a new function. As a result, each button can be used to initiate a function depending upon the specific application being controlled by the control panel unit, where the function to be initiated may change depending on the context.

According to another aspect of the invention, the soft labels adjacent to the button inputs can identify members of a family or any group of people. Upon actuating one of the physical button inputs, a user profile for the person identified by the soft label associated with the button can be launched and information for the specific user can be displayed in the main display region. Also, applications identified in the user profile for the person can be displayed adjacent to the button inputs. Thus, the display region may indicate the context of three buttons as email, voice mail, and appointments. Upon actuation of the button indicating email, the email application for the user may be launched and the soft labels can change to represent functionality available (e.g., read, create mail, etc.). By actuating the button associated with the soft label representing the read function, the first email for the user is opened and the soft labels indicate the next functionality for the button inputs. In another aspect, another button provides the ability to scroll through information displayed in the main display region when appropriate, such as emails. In certain instances, scrolling can change the functions available and may cause a soft label to fade out or display a functionality as a user scrolls through various lists.

In another aspect of the invention, the button inputs can have illuminable portions, which represent the context of the buttons. An icon on the button may represent a particular action or function. When the icon is illuminated, actuation of the button may cause an action represented by the icon to be initiated. Illustrative actions include audio, calendar, news and messaging applications.

In yet another aspect of the invention, the control panel unit may be scaled to provide a richer user interface (UI) based on the display characteristics. An illustrative UI can range from simple LED notification, text-to-speech of email messages to a full UI with a touch panel interface and graphics picture frame. That is, the UI for the display unit of the control panel unit may include an LCD (liquid crystal display), LED (light emitting diode) or EL (electroluminescent) display panel. Also, the display unit may function as a UI for Internet radio, video, "push information", music player (mp3, Microsoft® Windows® Media Audio, etc.), or become the hardware equivalent of a multimedia player. Further, the display unit can be the display for applications such as a jukebox, boombox, stock ticker, electronic picture frame, etc.

These and other novel advantages, details, embodiments, features and objects of the present invention will be apparent to those skilled in the art from following the detailed description of the invention, the attached claims and accompanying drawings, listed herein, which are useful in explaining the invention.

III. BRIEF DESCRIPTION OF DRAWINGS

FIG. 5 shows the front of an illustrative control panel unit according to embodiments of the present invention.

FIGS. 6A–6I show illustrative viewable states of button inputs in accordance with an illustrative embodiment of the present invention.

FIGS. 10A and 10B depict control panels according to exemplary embodiments of the present invention.

Figure 11A:
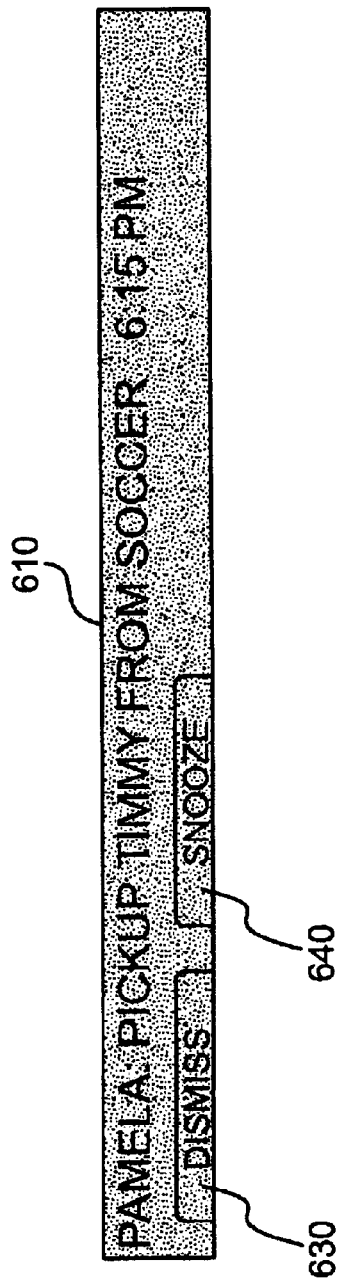
Figure 11B:
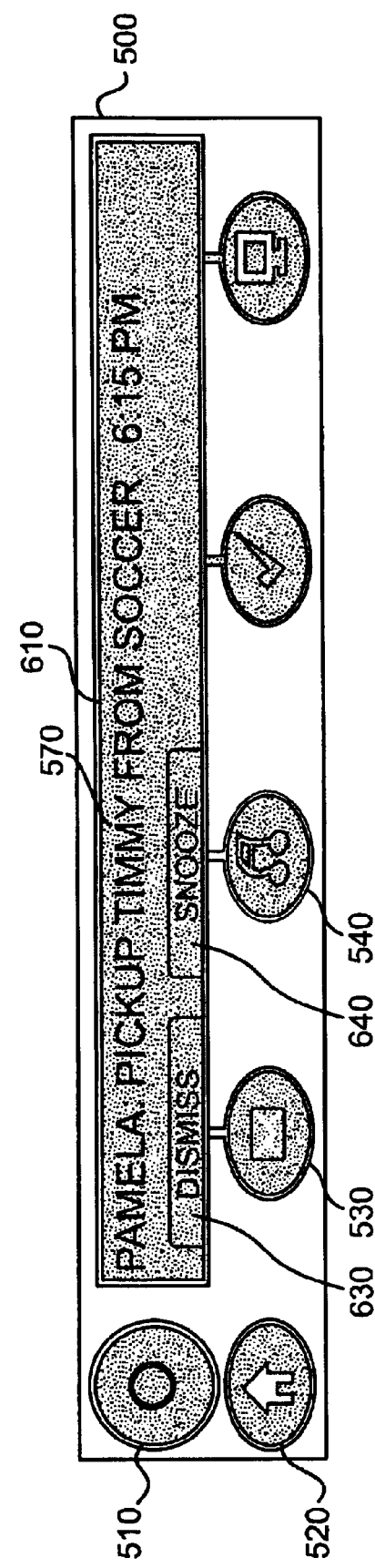

FIG. 11A displays a display panel and FIG. 11B displays a control panel according to exemplary embodiments of the invention.

FIGS. 12A–12E show an illustrative implementation of the context sensitive soft labels according to the present invention.

FIGS. 13A–13E show illustrative flows of various applications according to illustrative embodiments of the present invention.

IV. DETAILED DESCRIPTION

The present invention relates to a user interface (UI) for an electronic device having context sensitive labels. The UI may display, among other features, status/notification information, applications, system messages, and the like. Electronic devices generally include all types of devices having processing capability including, but not limited to, desktop, handheld, and portable computing devices and appliances, as well as computing devices and appliances which may be found in various environments, including home or office environments.

Although not required, portions of the invention may be described in the general context of computer-executable instructions, such as program modules. Generally, program modules include routines, programs, objects, scripts, components, data structures, etc. that perform particular tasks or implement particular abstract data types. Moreover, those skilled in the art will appreciate that the invention may be practiced with any number of computer system configurations including, but not limited to, distributed computing environments where tasks are performed by remote processing devices that are linked through a communications network. In a distributed computing environment, program modules may be located in both local and remote memory storage devices. A control panel unit according to the present invention may also be practiced with personal computers (PCs), hand-held devices, multiprocessor systems, microprocessor-based or programmable consumer electronics, network PCs, minicomputers, mainframe computers, and the like.

Figure 1:
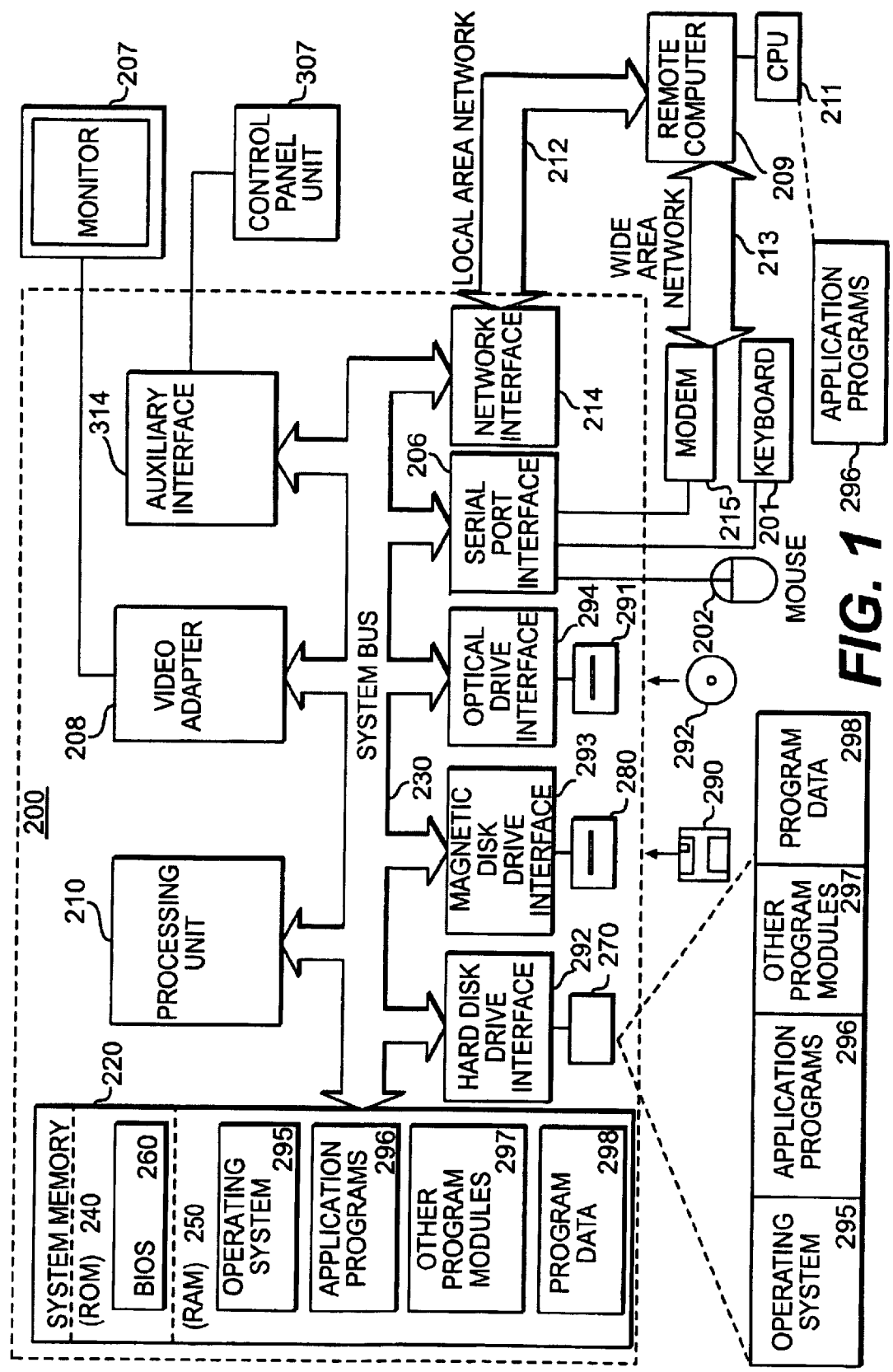
FIG. 1 shows a general-purpose computer system that may be used with a control panel unit in accordance with embodiments of the present invention.

FIG. 1 is a schematic diagram of a computing environment with which the present invention may be implemented. The present invention may be implemented within a general purpose computing device in the form of a conventional personal computer 200, including a processing unit 210, a system memory 220, and a system bus 230 that couples various system components including the system memory to the processing unit 210. The system bus 230 may be any of several types of bus structures including a memory bus or memory controller, a peripheral bus, and a local bus using any of a variety of bus architectures. The system memory includes read only memory (ROM) 240 and random access memory (RAM) 250.

A basic input/output system 260 (BIOS), containing the basic routines that help to transfer information between elements within the personal computer 200, such as during start-up, is stored in ROM 240. The personal computer 200 further includes a hard disk drive 270 for reading from and writing to a hard disk, not shown, a magnetic disk drive 280 for reading from or writing to a removable magnetic disk 290, and an optical disk drive 291 for reading from or writing to a removable optical disk 292 such as a CD ROM or other optical media. The hard disk drive 270, magnetic disk drive 280, and optical disk drive 291 are connected to the system bus 230 by a hard disk drive interface 292, a magnetic disk drive interface 293, and an optical disk drive interface 294, respectively. The drives and their associated computer-readable media provide nonvolatile storage of computer readable instructions, data structures, program modules and other data for the personal computer 200.

Although the exemplary environment described herein employs a hard disk, a removable magnetic disk 290 and a removable optical disk 292, it should be appreciated by those skilled in the art that other types of computer readable media which can store data that is accessible by a computer, such as magnetic cassettes, flash memory cards, digital video disks, Bernoulli cartridges, Zip/Jaz disks, random access memories (RAMs), read only memories (ROMs), and the like, may also be used in the exemplary operating environment.

A number of program modules may be stored on the hard disk, magnetic disk 290, optical disk 292, ROM 240 or RAM 250, including an operating system 295, one or more application programs 296, other program modules 297, and program data 298. A user may enter commands and information into the personal computer 200 through input devices such as a keyboard 201 and pointing device 202. Other input devices (not shown) may include a microphone, joystick, game pad, satellite dish, scanner, or the like. These and other input devices are often connected to the processing unit 210 through a serial port interface 206 that is coupled to the system bus, but may be connected by other interfaces, such as a parallel port, game port or a universal serial bus (USB).

A monitor 207 or other type of main display unit is also connected to the system bus 230 via an interface, such as a video adapter 208. Also, a control panel unit 307, which can include a display (e.g., an auxiliary display), is coupled to the system bus 230 via an auxiliary interface 314. In addition to the main display unit and the control panel unit, personal computers typically include other peripheral output devices (not shown), such as speakers and printers.

Although a control panel unit 307 according to the present invention may not have a display associated therewith, for purposes of this description, it is assumed that the control panel unit 307 includes a display. Further, it should be understood that a control panel unit of the present invention may be part of the auxiliary display unit described in commonly assigned, co-pending application Ser. No. 09/556,982, filed Apr. 24, 2000, entitled "Auxiliary Display Unit For a Computer System" to Vong et al., which is herein incorporated by reference.

The auxiliary interface 314 can couple the processing unit 210 to the control panel unit 307 in various ways. It should be understood that the terms "couple," "coupling", "coupled" and grammatical variations thereof as used herein mean all known wired and wireless connections. Interfaces between the control panel unit 307 and the personal computer 200 include, but are not limited to, an expansion card, standard communication interfaces such as serial, parallel, 1394, or USB (universal serial bus) connectors, IR, Ethernet, RF or Power Line Carrier.

The personal computer 200 may operate in a networked environment using logical connections to one or more remote computers, such as a remote computer 209. The remote computer 209 may be another personal computer, a server, a router, a network PC, a peer device or other common network node, and typically includes many or all of the elements described above relative to the personal computer 200, although only a memory storage device 211 has been illustrated in FIG. 1. The logical connections depicted in FIG. 1 include a local area network (LAN) 212 and a wide area network (WAN) 213. Such networking environments are commonplace in offices, enterprise-wide computer networks, intranets and the Internet.

When used in a LAN networking environment, the personal computer 200 is connected to the local network 212 through a network interface or adapter 214. When used in a WAN networking environment, the personal computer 200 typically includes a modem 215 or other means for establishing a communications over the wide area network 213, such as the Internet. The modem 215, which may be internal or external, is connected to the system bus 230 via the serial port interface 206. In a networked environment, program modules depicted relative to the personal computer 200, or portions thereof, may be stored in the remote memory storage device. It will be appreciated that the network connections shown are exemplary and other means of establishing a communications link between the computers may be used.

Figure 2:
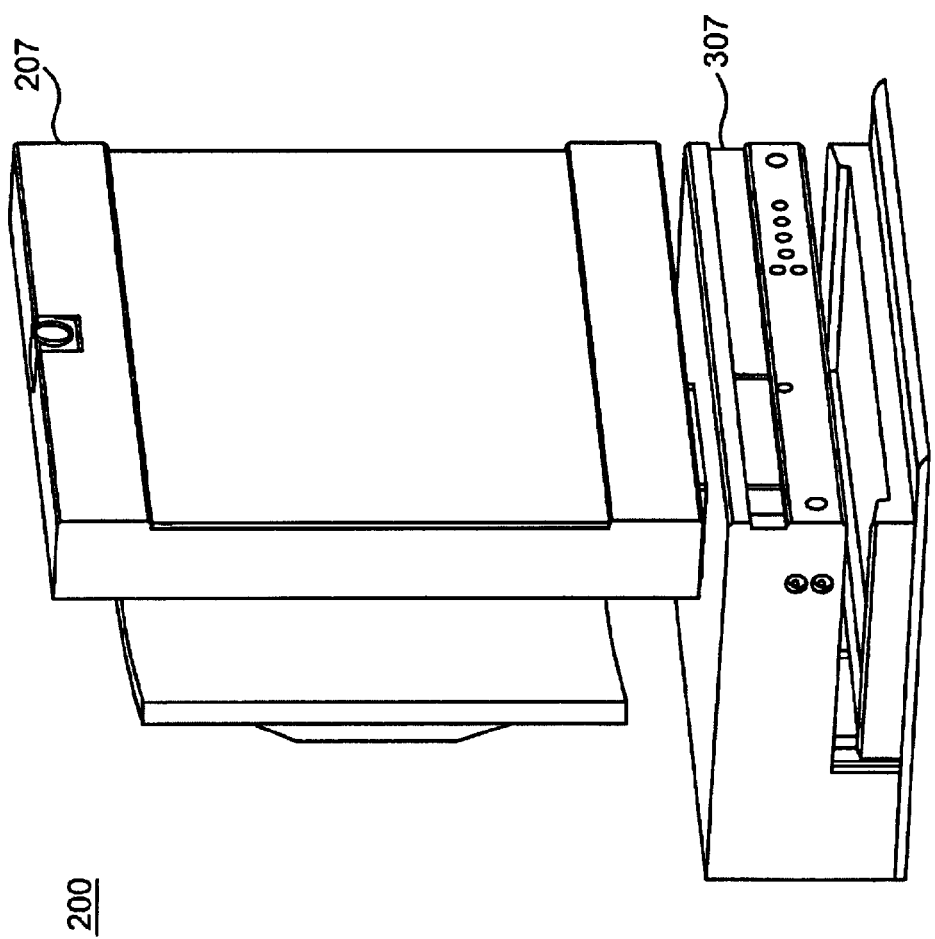
FIG. 2 shows the physical structure of an illustrative computer system according to embodiments of the present invention.

FIG. 2 shows the physical structure of an in illustrative computer system according to embodiments of the present invention. In FIG. 2, a personal computer (PC) 200 is physically integrated with a main display unit or monitor 207 and a control panel unit 307. Thus, the PC 200 including the main display unit 207 and control panel unit 307 is shown as part of the same physical structure. As described further herein, the control panel unit 307 may be a standalone device with or without an auxiliary display, or part of an auxiliary display unit (as described in application Ser. No. 09/556,982 referred to above).

Figure 3:
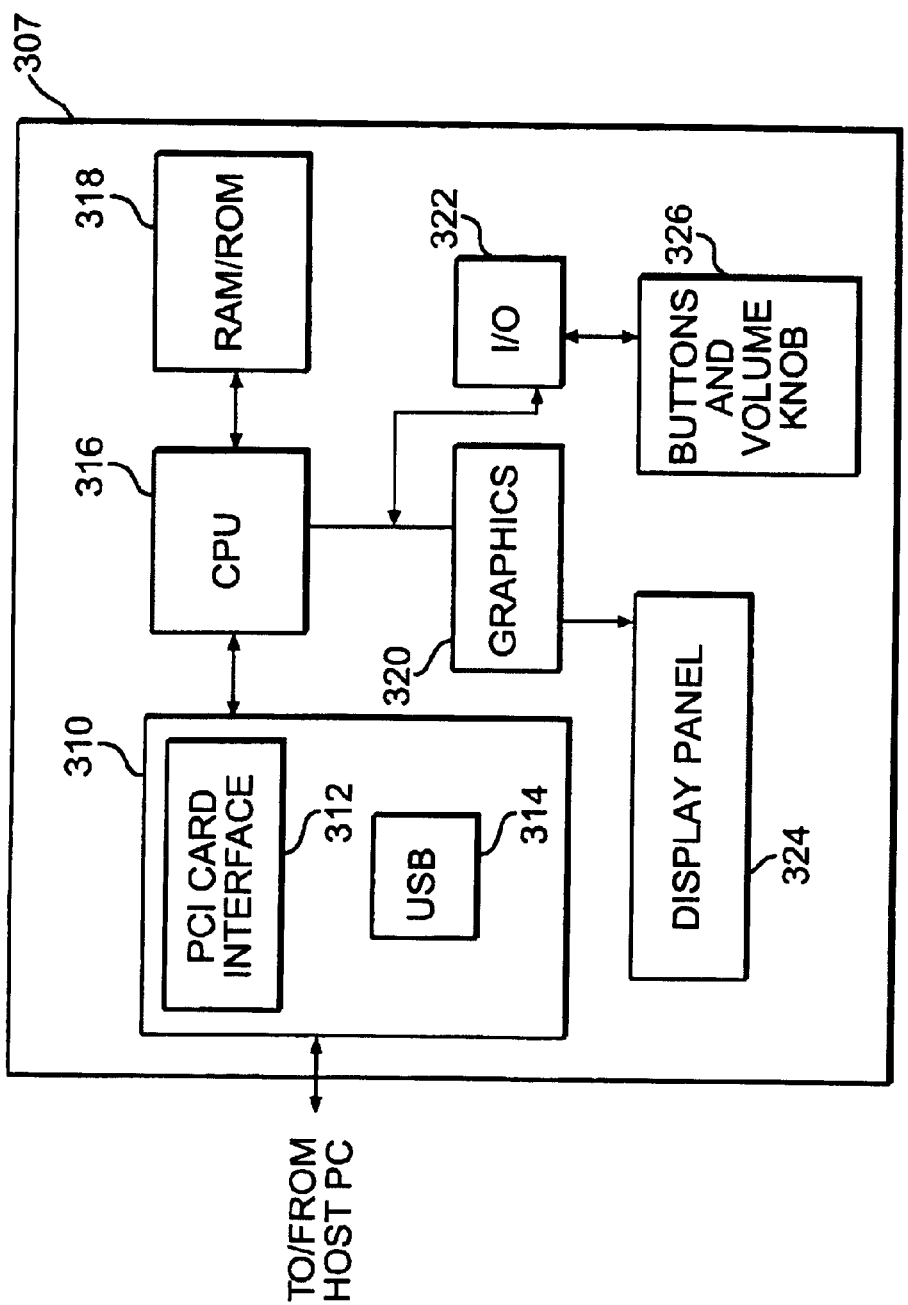
FIG. 3 shows a block diagram of a control panel unit according to an illustrative embodiment of the present invention.

According to embodiments of the present invention, the control panel unit 307 may display information under the control of the PC 200. FIG. 3 depicts a block diagram of the control panel unit 307 according to an illustrative embodiment of the present invention. The host PC auxiliary interface 314 may be a standard communication or card interface for communicating with the control panel unit 307. The host PC auxiliary interface can be adapted for an expansion card and standard communication interfaces known in the art such as serial, parallel, 1394, or USB, IR, Ethernet, RF or Power Line Carrier.

In the illustrative embodiment of FIG. 3, the control panel unit 307 includes an interface 310 including a PCI card interface 312 and a USB interface 314 for communicating with the host PC. The interface 310 is coupled to a CPU 316. The CPU 316 is coupled to local memory such as RAM/ROM 318. The CPU 316 receives the commands through the interface 310 from the host PC and interacts with local memory, e.g., RAM/ROM 318 as necessary and causes the appropriate commands to be directed to a graphics module 320, which in turn generates an appropriate display to be shown on the display panel 324. Also, the CPU 316 is coupled to an I/O module 322, which can receive user input through buttons and volume knob 326, such as by way of a user turning the volume knob or actuating one of the buttons. The CPU 316 may output information through the I/O module 322. For example, audio may be output or a button may be illuminated. It should be understood that buttons and volume knobs are illustrative input/output devices and that the present invention is not so limited. For example, the I/O module 322 and graphics module 320 may both be connected to the display panel 324, where inputs may be received by way of a touch screen. Further, I/O module 322 may be connected to a microphone, speakers, an IR (infrared) sensor device that can identify a user, a camera, a keypad, etc.

Figure 4:
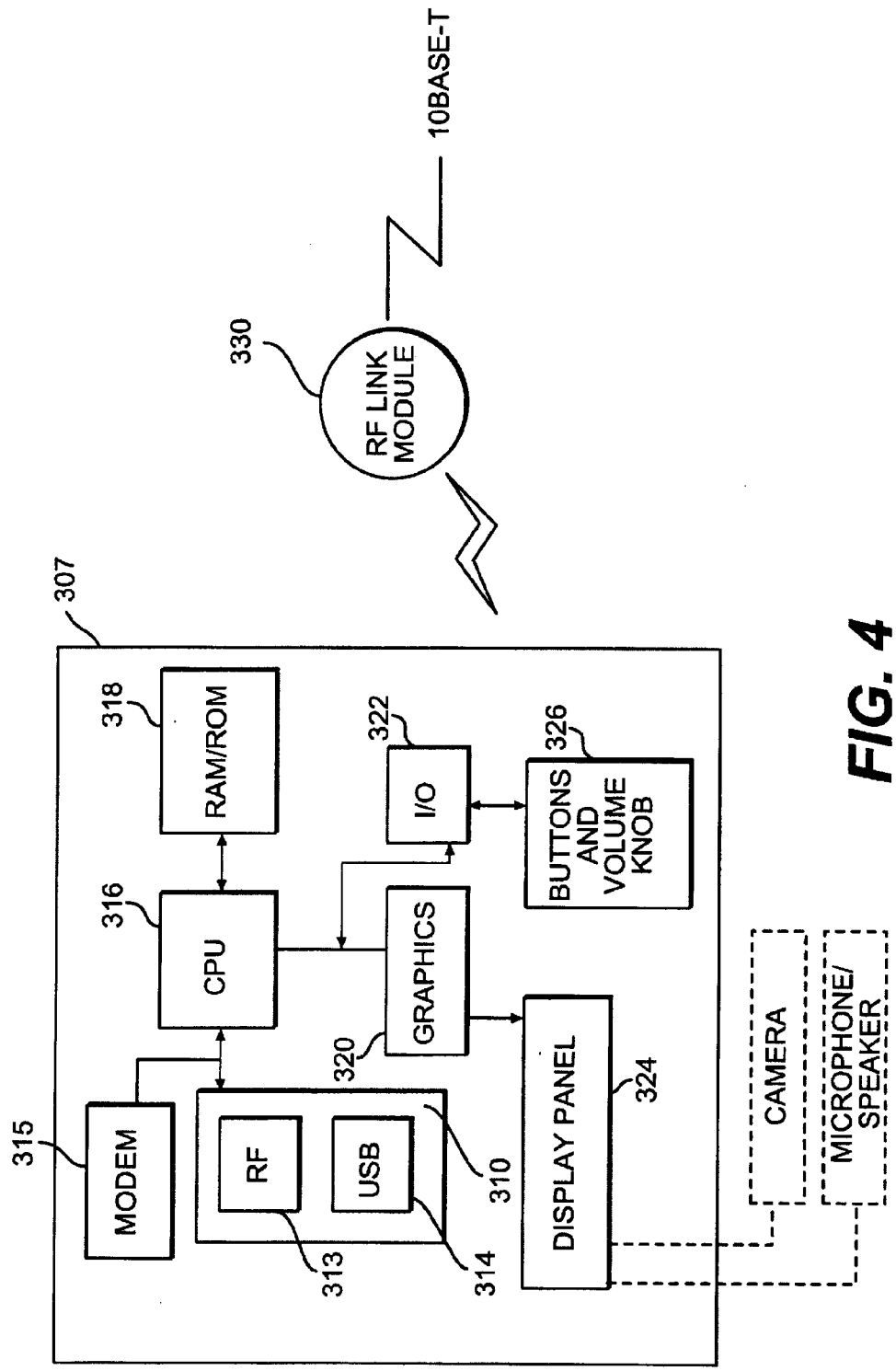
FIG. 4 shows a block diagram of a control panel unit according to another illustrative embodiment of the present invention.

FIG. 4 shows another illustrative implementation of a control panel unit according to an embodiment of the present invention. Elements in FIG. 4 that are the same as elements in FIG. 3 have been labeled with the same reference numerals. In FIG. 4 the host computer includes an RF link module 330 for interfacing with the control panel unit 307, and in particular with the RF interface 313, which forms part of the interface 310. In contrast to FIG. 2 and in accordance with FIG. 4, the host computer and the control panel unit are not physically attached to each other.

The RF link module 330 may be coupled to a server by way of a standard wired connection, such as 10Base-T or 100Base-T. When coupled to a server, the host computer may be one of plural host computers coupled to a server. Alternatively, the RF link module 330 may be external to the host computer, and within broadcast range of the RF interface 313 of the control panel unit 307. In this arrangement, a standard wired connection, such as 10Base-T or 100Base-T, could be used to provide signaling between the RF link module 330 and the host computer.

In embodiments of the invention where multiple control panel units (either fixed or mobile) are coupled to the host computer and spread out over a wide area (e.g., in a home or office environment), various RF link modules can better facilitate communication between the host computer and control panel units. In a home environment, individual rooms or areas around a house may have a dedicated RF link module 330 for uploading and downloading information (e.g., audio, video, multimedia, data, etc.) between the host computer and each control panel unit. This may be particularly beneficial in areas such as a kitchen or living room where multiple control panel units may exist. Control panel units may be implemented in many devices including, but not restricted to, various kitchen appliances, communication devices (e.g., cable, satellite, and Internet televisions, satellite or Internet radios, and mobile and landline communication units), security systems, electronic game equipment, electronic picture frame, web companions and Internet appliances. These devices may be fixed or some may be used portably such as a wristwatch or handheld Internet appliance. Further, many elements may be coupled to the I/O module 322 of the control panel unit including, but not limited to, a camera, biometric identification module and motion sensor (e.g., as a login method and for security), Internet appliances, electronic game equipment, wireless (e.g., IR and RF) remote control devices (e.g., for an MP3 player, CD player, Internet appliance, radio, television, electronic game equipment, VCR, etc.).

In addition as shown in the FIG. 4 embodiment, a modem (e.g., 56 k) may be coupled to the control panel unit CPU 316 and the interface 310. Responsive to a command received from the host computer 200 or the CPU 316, the modem can connect the control panel unit 307 to the Internet or other data communication networks without having to route the information through the host computer. This implementation may be particularly beneficial when multiple Internet connections (e.g., phone lines, DSL, cable-modem, ISDN) are accessible. That is a user of the control panel unit may not have to share bandwidth with a user of the main display monitor who accesses the Internet via the host computer. The host computer can send commands to the control panel unit to initiate its own connection to the Internet. Also, the control panel unit may be separately addressable and capable of receiving information directly from the Internet such as "push" type data including stock ticker information, sports scores, news, etc.

The display panel 324 may have a resolution of, for example, 256×64 pixels. In an illustrative two-line mode, the display panel may be broken up into four sections vertically, a top section 24 pixels high (24×24 font display), a second section 16 pixels high (16×16 font display), a third section 8 pixels high (no text or image display) and a bottom section 16 pixels high with a tab area (16×16 font display). In an illustrative three-line mode, the display panel may be broken up into four sections vertically; a top section, second section and third section 16 pixels high (16×16 font display), and a bottom section 16 pixels high with a tab area (16×16 font display). Theses mode may be employed for all screens.

Further, a control panel unit according to the invention, such as FIG. 4, may be configured to have a touch screen display, a video camera—intercom system, email notification on the display panel in the form of video or text or output by a speaker for voice. The display panel may be a display dedicated for or adapted to display information for an MP3, DVD, CD player, electronic picture frame, or Internet site coupled to the control panel unit 307. The display panel may be adapted for multiple types of information included, but not limited to, calendar information, voice mail notification, email notification, clock, help information, stereo controller and view, caller ID status, shopping cart tally, pop-up video (anecdotes, facts, trivia), control panel for home and PC (e.g., status of oven, dryer, print job), news headlines, sports scores, weather, stock ticker, traffic information, reminders, notices, operating system ("OS") alerts, appointment list, web site map, application status, financial information, favorites, history, most recently used documents, applications, or servers, email preview (e.g., first three lines of email), list of new emails, chat notification, gaming information, and other types of information.

In one implementation of the control panel unit, the UI may include buttons, which may be actuated by depression or responsive to proximity or touch sensitivity. Actuation of the buttons initiates an action. An illustrative front panel 500 of the control panel unit is shown in FIG. 5. The front panel includes six buttons 510, 520, 530, 540, 550, 560 and a display panel 570. Each of the buttons 520, 530, 540, 550 and 560 has icons thereon. The icons can represent a specific action or function associated with the button. In this illustrative embodiment, the icons depicted on buttons 520, 530, 540, 550 and 560 represent HOME, MESSAGING, MUSIC, TASKS, and MORE.

All the buttons shown in FIG. 5 have an illuminable characteristic where the button may take on different viewable states. A center portion of button 510 may be in an illuminated state or de-illuminated state as shown FIGS. 6A and 6B, respectively. Also, buttons 530, 540, 550 and 560 may take on different illuminating states. Illustrative illuminating states of button 530 are depicted in FIGS. 6C, 6D and 6E. In FIG. 6C, the messaging icon is illuminated while in FIG. 6D the message icon is de-illuminated. FIG. 6E shows a light ring around the button to identify another state. States may be represented by any combination of illuminated and de-illuminated portions.

FIGS. 6F–6I represent the states of a physical button with an LED. The button may be located on a display panel (not shown in FIG. 5) such as a display panel similar to FIG. 5 in an area to the right of the display area. The various states of the button shown in FIGS. 6F–6I are controlled by the context of the software UI. The various states of the LEDs for the up and down arrow combinations are shown in FIGS. 6F–6I. In FIG. 6F, both arrows are illuminated representing that more information exists in the display area to scroll up or down to (for example in one embodiment, the middle three of five available music titles is displayed with more information being available for display by scrolling in either direction, i.e., one title above and one title below). In FIG. 6G, both arrows are de-illuminated representing that no further information exists to scroll up or down to. In FIG. 6H, the up arrow is de-illuminated and the down arrow is illuminated representing that more information exists to scroll down to only. In FIG. 6I, the up arrow is illuminated and the down arrow is de-illuminated representing that more information exists to scroll up to only. The button may include two actuatable button portions corresponding to the up and down arrows. Depression of the up arrow portion may cause the display to scroll up depending on the button state. Similarly, depression of the down arrow portion may cause the display to scroll down depending on the button state.

Also, in one embodiment, the color of portions of the button, for example the icon, LED, or soft label, may vary from one state to another. The color of the button may impart information. For example, the color can denote the user (e.g., different members of a family or group). A particular color may always be associated with a specific button or the color of a button may change to indicate a change of state or that information is associated with a specific userAny characteristic that may change can be employed to represent a state of a button. Other possible characteristics include, but are not limited to, intensity of the illuminating portion, button texture, and other factors of button appearance such as flashing and blinking including flashing and blinking frequency and flashing and blinking sequences. These states may be affected by program routines associated with the control panel unit and/or by program routines located at another location in a networked environment.

Each of the various viewable states of the buttons may represent a function or action that will occur when the button is actuated. When the icon on buttons 530, 540, 550 and 560 is illuminated, actuation of the particular button can result in an application being launched or initiated. For example, actuation of button 530 when the icon on the button is illuminated may cause the control panel unit to launch a messaging application. In response to actuation of the button 530, the states of the buttons 530, 540, 550 and 560 may change to represent a different action. Illustratively, the icon on button 550 may become de-illuminated and the ring portion on the periphery button may be illuminated. Such a state of the button 550 may represent that the status application represented by the icon cannot currently be launched or initiated. Instead, actuation of the button 550 may result in the performance of a task, action or function associated with the messaging application (e.g., view emails, view voice mails, etc.). Further, in response to actuation of the button 530, the icon on button 560 may be de-illuminated and the ring portion around the periphery of the button may remain de-illuminated representing that the more function cannot be launched and that actuation of the button 560 will not result in the performance of any function. That is, this state may represent that the button 550 is temporarily disabled.

Actuation of the HOME button 520 may cause the control panel unit to return the buttons to the initial or home state. In one embodiment, the home state may be the button states represented as shown in FIG. 5. Returning to the home state may cause an open application to be closed, and the user to be "logged out". Button 510 may be used as a toggle or scrolling button/knob. Illustratively, if more than four actions are available to a user at any time (with only buttons 530, 540, 550, 560 to initiate the action), the user could select the MORE button 560 to access a list of additional available applications (not shown). Once viewing the list of additional applications, the user may scroll through the available applications using button 510 and launch a highlighted application using the button 530.

In an alternative implementation, if five actions are available, successive actuation of button 510 may cause the action defined by button 560 to toggle between two different actions. If six actions are available, actuation of button 510 may result in one action being assigned to button 560. Following successive actuations, three different actions may be scrolled through and assigned to button 560.

Figure 7A:
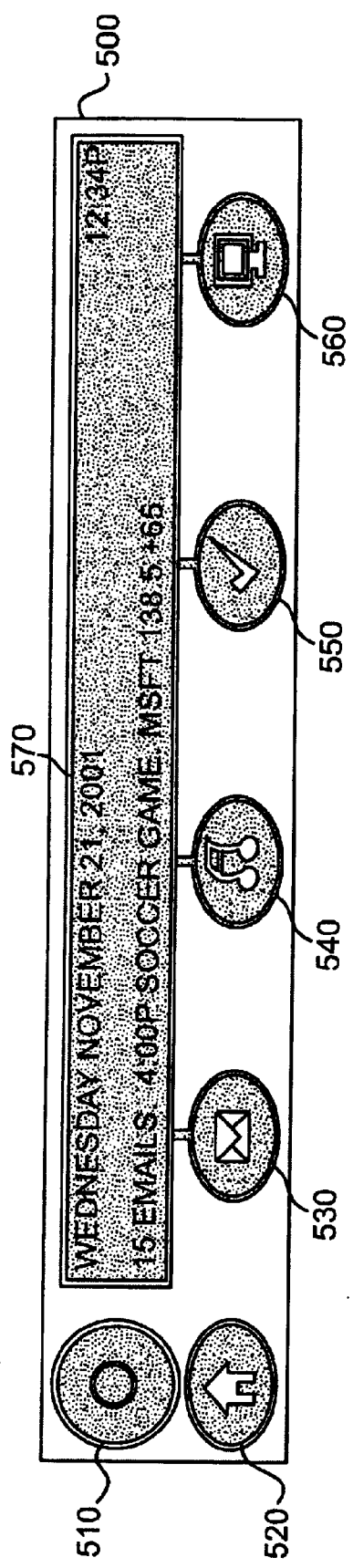
FIGS. 7A and 7B show control panels according to an exemplary embodiment of the present invention.

FIG. 7A shows the home or initial state according to an exemplary embodiment of the present invention. In this embodiment, the display panel 570 displays various information. Many different types of information may be displayed. In FIG. 7A information shown includes date, time, number of email messages, next scheduled appointment, and the status of the user's stocks. It should be understood that the information displayed on the display panel 570 may automatically change by rotating among various pieces of information (e.g., number of new email messages, date, time, stock prices, etc.). In addition, certain types of information including time, weather, stock prices, sports scores, traffic, etc. may be updated or refreshed from a source such as the host computer or Internet. Illustratively, the display panel may change every three seconds in the home state. First, the current date and time may be displayed followed by the next appointment for the day, followed by the number of emails received and back to the current date and time. During other applications, it is possible that the information displayed may also periodically change back and forth from current information in the active application to general status information such as identification of the date, time, number of email messages and next scheduled appointment. Also, notification alerts generated, by the host PC for example, of specific information such as receipt of a new email, reminder of an upcoming appointment, OS alerts (e.g., printer out of paper) and alerts for a specific application may be displayed as an associated event occurs.

Figure 7B:
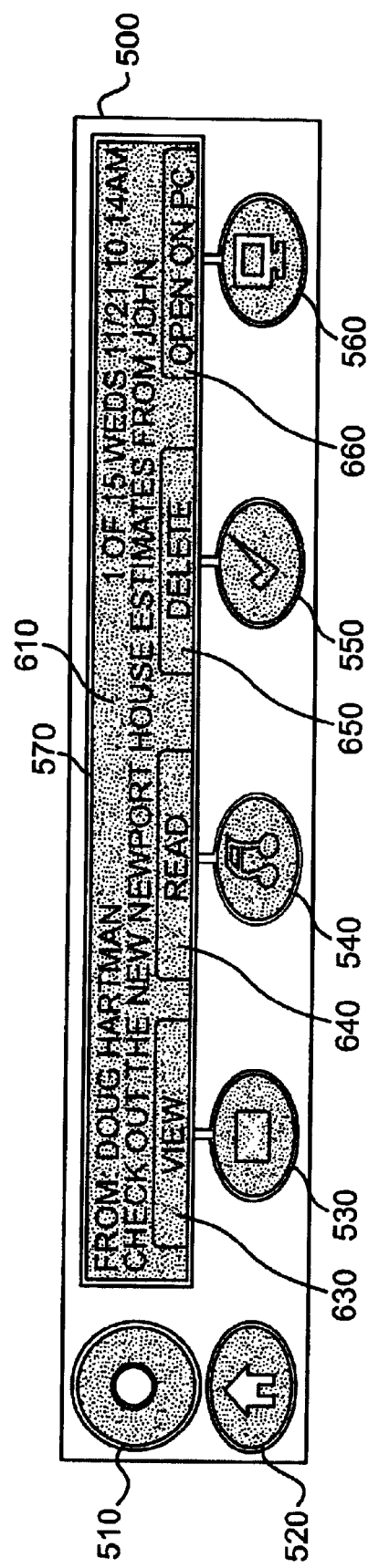

Actuation of button 530 in FIG. 7A may cause the control panel unit to launch or initiate the messaging application. FIG. 7B depicts an exemplary front panel of the control panel unit responsive to actuation of the messaging application from the home state shown FIG. 7A. In this embodiment, button 510 provides a scrolling user interface that allows the user to scroll through email messages. It should be understood that certain types of responses might not be available for each email sender (e.g., online chat). Consequently, scrolling can cause the soft labels to change, where a function is identified by a soft label as available for one message and not identified by a soft label as available for a second message.

The subject of the email, the sender, the time and date the message was sent, and the number of messages (e.g., unopened) may be displayed in the main display region 610 of the display panel 570. Also, the display panel 570 may include, but is not restricted to, four display regions 630, 640, 650, 660 located adjacent to buttons 530, 540, 550, 560, respectively. A context sensitive soft label can be displayed in each of the four display regions. It should be understood that the four display regions are not reserved exclusively for soft labels, but may be used for displaying content rather than soft labels as shown in FIG. 7A. The soft label can represent an action, function or task associated with the button adjacent thereto. Hence, the control panel unit can initiate the action, function or task upon actuation of the respective button. Responsive to actuation of a button, the context sensitive soft labels associated with a button may change to represent another function, action or task responsive to actuation of any of the buttons. In FIG. 7B, the periphery of the buttons 530, 540, 550, 560 is illuminated indicating that the buttons can perform a function, action or task upon actuation. It should be understood that in other implementations of the present invention (not shown), other portions of the buttons could be illuminated to represent, among other things, the functionality or status of the buttons. The context sensitive soft labels VIEW, READ, DELETE, OPEN ON PC in display regions 630, 640, 650, 660, respectively, indicate the function, action or task that can be performed in the context of the messaging application when the corresponding button is actuated. The open on PC function launches an item (e.g., an application, message, etc.) on a PC, which is coupled to the control panel unit. The control panel unit may be remote from the PC and wired or wirelessly coupled thereto. Actuation of the button 510 may cause the next message to be displayed in the main display region 610 (e.g., message 2 of 15), replacing the current message. In other implementations of the present invention, actuation of the button 510 may permit the user to scroll through the body of the message.

Another implementation of the display panel for a specific user profile is shown in FIGS. 8A–8D. A user profile is predefined personalized content to be shown for a specific user including the appearance of the user interface. The user profile may be set up and/or activated when a user logs in to the system, making the control unit and host computer aware of the presence of the user.

In FIGS. 8A–8D, the display regions 630, 640, 650, 660 may correspond to respective adjacent buttons (not shown).

Alternatively, the display regions 630, 640, 650, 660 may themselves be touch-sensitive or otherwise actuatable buttons. The display of FIG. 8A may represent the home state for a control panel or alternatively, may be a state following launching or initiating an action or user profile.

Figure 8A:
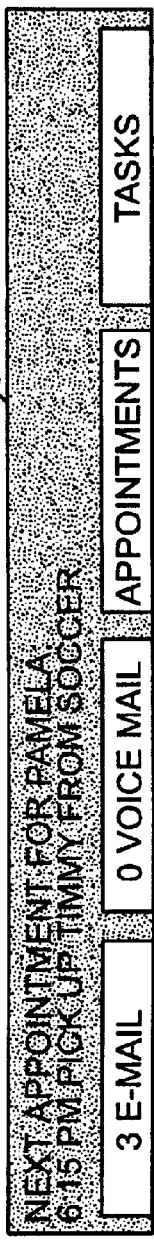
FIGS. 8A–8D depict display panels according to exemplary embodiments of the present invention.

For purposes of this discussion, it will be assumed that the messaging application was launched by actuation of a button resulting in the display panel depicted in FIG. 8A. The four context sensitive soft labels displayed in the display regions 630, 640, 650, 660 may represent the functionality of a corresponding adjacent button in the context of the messaging application. Alternatively, the context sensitive soft labels may represent the functionality of a touch sensitive button in the context of the messaging application where the button can be the respective display region. The context sensitive soft label in display region 630 represents that the email application of the messaging application can be initiated if the corresponding button is actuated. Similarly, the context sensitive soft label in display region 640 represents that a voice mail application can be initiated if the corresponding button is actuated; the context sensitive soft label in display region 650 represents that the appointments application will be initiated if the corresponding button is actuated; and the context sensitive soft label 660 represents that the tasks application can be initiated if the corresponding button is actuated.

Figure 8B:
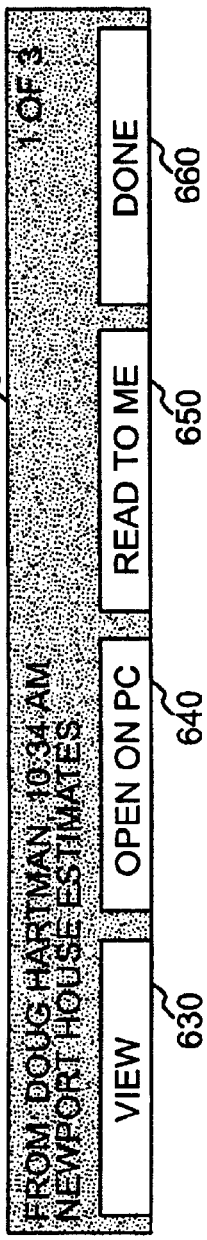
Figure 8C:
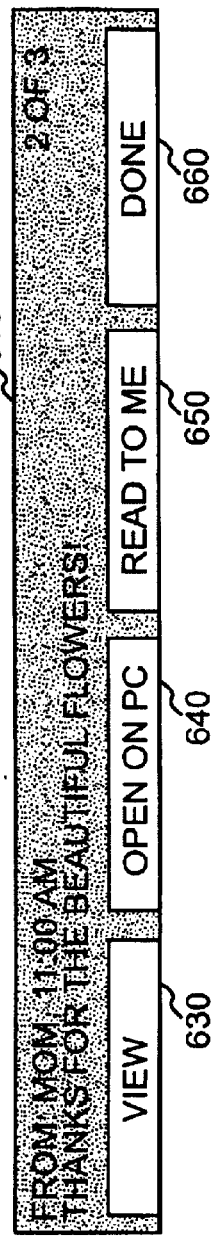
Figure 8D:
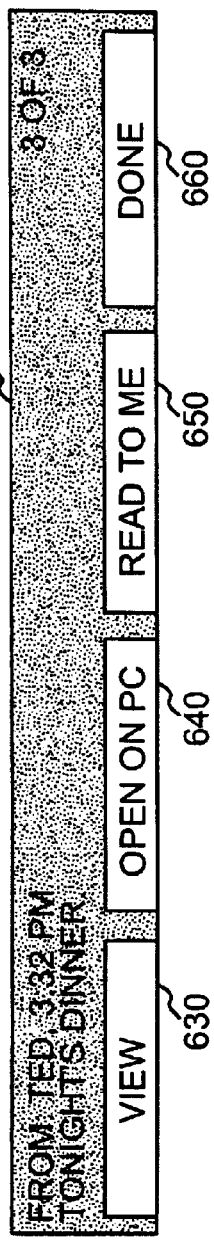

Responsive to actuation of the button that initiates the email application, the context sensitive soft labels may change their content and the main display region 610 may display different information as shown in FIG. 8B. The context sensitive soft labels in the four display regions 630, 640, 650, 660 change to represent the functionality, action or task of View, Open on PC, Read to Me, and Done, respectively. The main display region 610 displays the author and the subject of the first of three emails readable by the user. Actuation of a scrolling button, e.g., button 510, can result in the main display region displaying the author and the subject of the second of three emails as shown in FIG. 8C. Another actuation of the scrolling button may result in the main display region 610 changing to display the information shown in FIG. 8D.

Figure 9A:
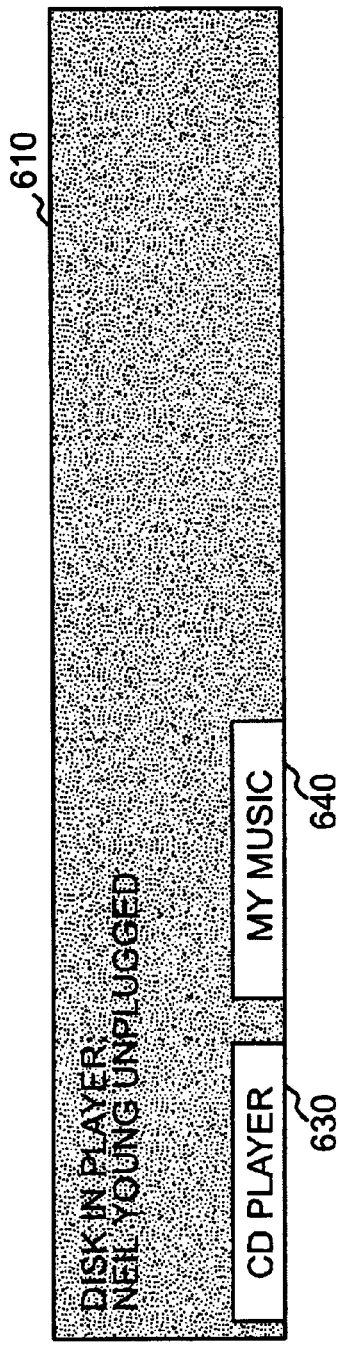
FIGS. 9A and 9B depict display panels according to other exemplary embodiments of the present invention.
Figure 9B:
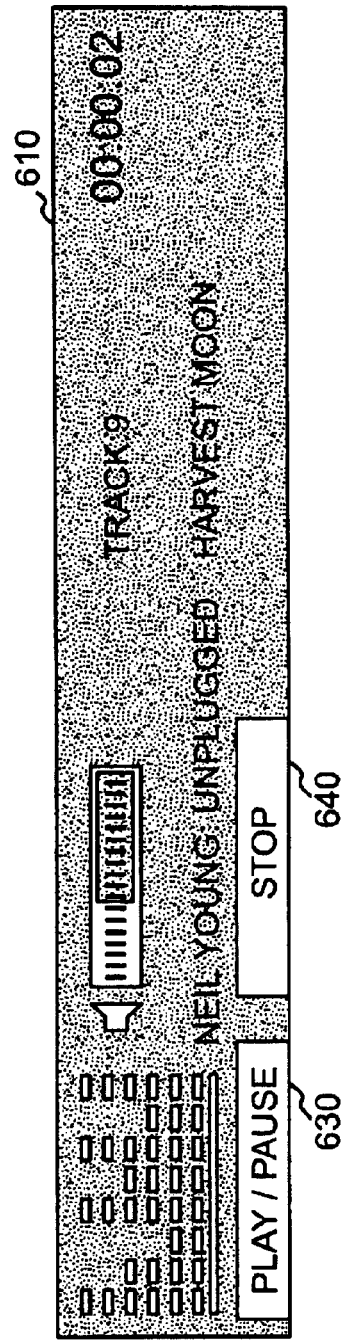

In response to selection of the music functionality, such as by actuating button 540 in FIG. 5, the display panel shown in FIG. 9A may be illustratively displayed. In the display panel of FIG. 9A, the main display region 610 displays information indicating that a disk is in the CD player controlled by the control panel unit. The context sensitive soft label in the display region 630 represents the function of initiating the CD player while the context sensitive soft label in display region 640 represents the function of initiating My Music. My Music can identify a My Music folder in the user's My Documents folder. Initiating the My Music function allows a user to navigate the My Music folder and ultimately select a music file or play list and launch the music player. Responsive to actuation of a button associated with the context sensitive soft label in display region 630, the CD player plays the CD and the context sensitive soft labels 630, 640 may change to represent CD player functions play/pause and stop, respectively as shown in FIG. 9B. Also, as illustrated in FIG. 9B, the main display region 610 displays information related to the CD player which can include, among other information, the name of the disk, the title and track of the song being played, the volume of the song, playing time, etc.

In another embodiment, in which the music functionality is selected, such as by actuating button 540 in FIG. 5, the control panel shown in FIG. 10A may be illustratively displayed. In FIG. 10A, the display panel 570 shows three illustrative music applications. As depicted in FIG. 10A, no soft labels are displayed. Thus, user awareness of the context for each of the buttons in FIG. 10A is represented by the illuminated states of the buttons 510, 520, 530, 540, 550, 560. By not displaying soft labels on the display panel 570, added screen real estate for displaying other data is available. On small display panels, screen real estate is at a premium and it is particularly advantageous to provide context to the user without using soft labels and relying on the states of buttons when possible.

By actuating the button 530 in FIG. 10A, the highlighted item/folder is selected and opened. Button 510 scrolls through the various applications items available and each time the button is actuated, the list of items scrolls up or down and a different application is highlighted. As with other applications, scrolling can change the soft labels because certain functionality may not be available for each item/folder. That is, in the FIG. 10A implementation, the highlighted application in the list is located in the middle of the list of three applications. Also in FIG. 10A, the buttons 540, 550, 560 are not illuminated and thus are inactive until, at least, the HOME button 520 or the button 530 is selected. In FIG. 10A, actuating the button 530 when the "CD: Neil Young 'Unplugged'" application is selected initiates playing of the CD. FIG. 10B illustrates a control panel that may appear responsive to actuation of the button 530. The main display region 610 can change during playing of the CD. FIG. 10B shows the context sensitive soft labels and button states which may immediately appear responsive to the actuation of the button 530 in FIG. 10A. The main display region 610 shown in FIG. 10B indicates the amount of time which the current track on the CD has been playing and does not show the exact same information displayed immediately responsive to actuation of button 530 in FIG. 10A. For example, the track and time may be different.

FIGS. 11A and 11B show two illustrative notification alert screen implementations of the present invention. FIG. 11A shows an implementation with soft labels, but without button inputs and FIG. 11B includes soft labels and button inputs. When an alert is displayed, the alert screen can be displayed in place of the previous display. An alert can be triggered by many different events such as when a message is received, an online chat is requested with a user of the control unit by another party, or as a reminder for an upcoming appointment as depicted in FIGS. 11A and 11B. The particular alert displayed in the main display region 610 warns a particular user (Pamela), and provides the subject of the appointment (pickup Tommy from soccer) and the time of the appointment (6:15 PM). Such an alert would appear some prescribed time prior to the actual appointment, such as 30 minutes. By selecting the soft label function Dismiss displayed in display region 630, control returns to the previous screen, which is then displayed, and the appointment is dismissed. If instead, the user selects the soft label snooze, control returns to the previous screen, which is then displayed and the alert is reset to remind the user again of the appointment in a predefined number of minutes (e.g., 10 minutes).

An illustrative implementation of the context sensitive soft labels is shown in FIGS. 12A–12E. The main display region 610 may display status information such as time, date and weather. In display regions 630, 640, 650, 660, soft labels identifying four users (e.g., Jon, Mandy, Dana and Rob) may be displayed. In an illustrative implementation, color may be used in the UI, where each user is assigned a specific color. The color may be used to notify the user when new information for him or her is present. In this instance, a button below the user's name can light up with an LED matching their assigned color or the background of the respective display region 630, 640, 650, 660 may be illuminated with their assigned color. Also, when the respective user selects their name, the entire UI may be displayed in their assigned color. The color schemes provide greater personalization and can allow a person to visually determine who is logged into the system from a distance and which individual has new information.

Figure 12A:
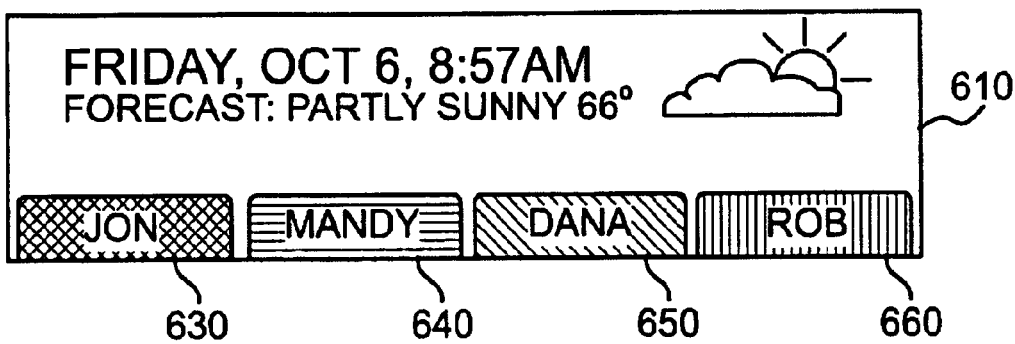
Figure 12B:
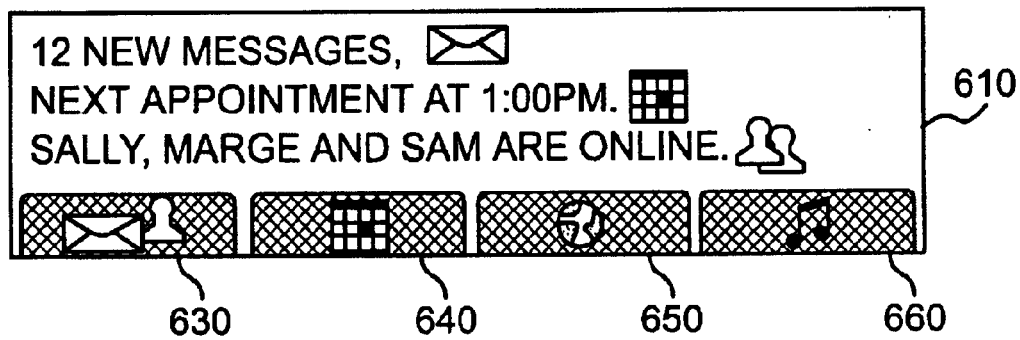
Figure 12C:
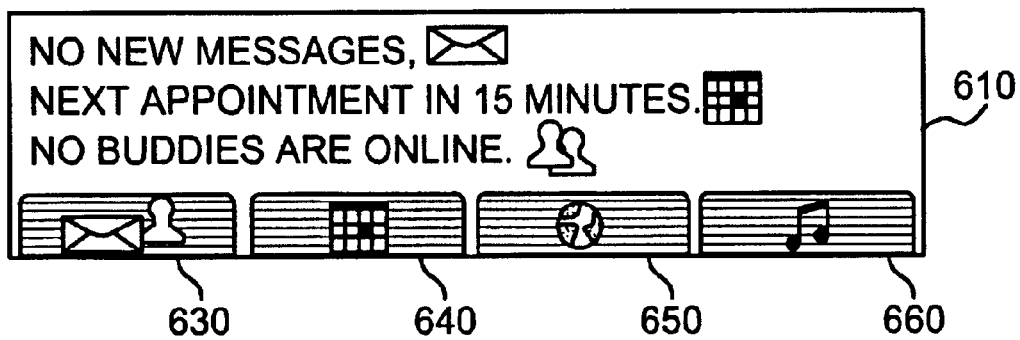
Figure 12D:
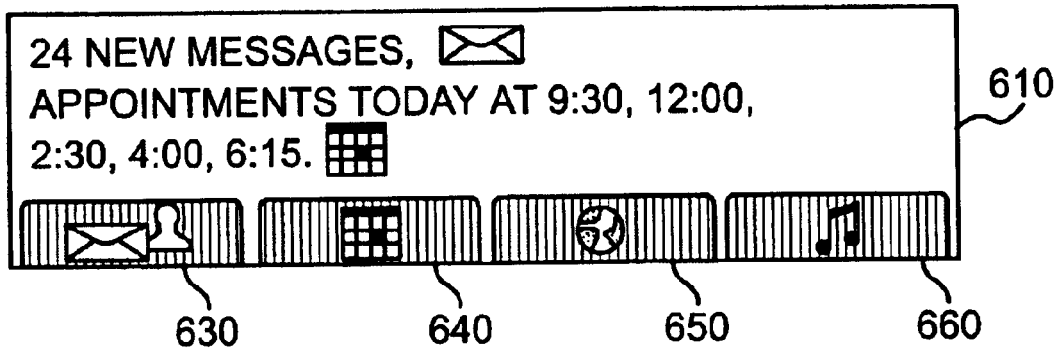
Figure 12E:
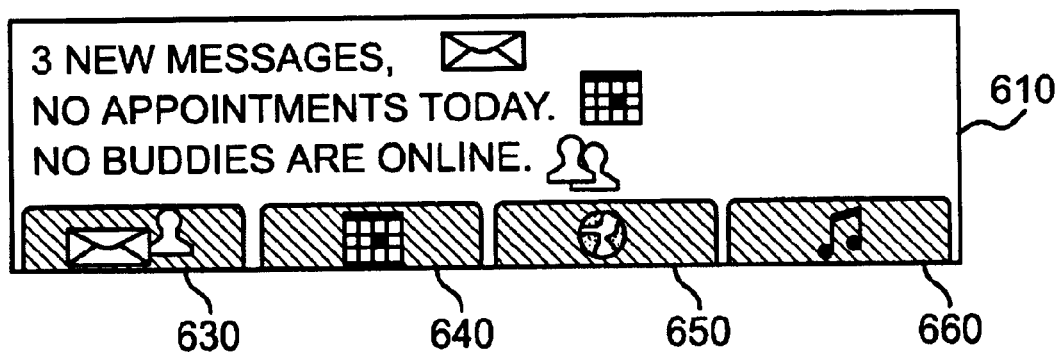

Responsive to actuation of the button corresponding to the soft label 630 or a soft button 630 corresponding to the user Jon, the context sensitive soft labels may change to identify the personalized applications for Jon as shown in his customized screen depicted in FIG. 12B. The applications may include, but are not limited to, messages, calendar, news and music. Similarly, actuation of the buttons associated with the users Mandy, Rob and Dana would present their customized screens depicted in FIGS. 12C, 12D and 12E, respectively. Content may be customized from within an application on the host computer. Content that can be personalized includes, but is not limited to, the home screen, the types of content displayed, the location of the content within the UI and the content of the respective user status.

Figure 13A:
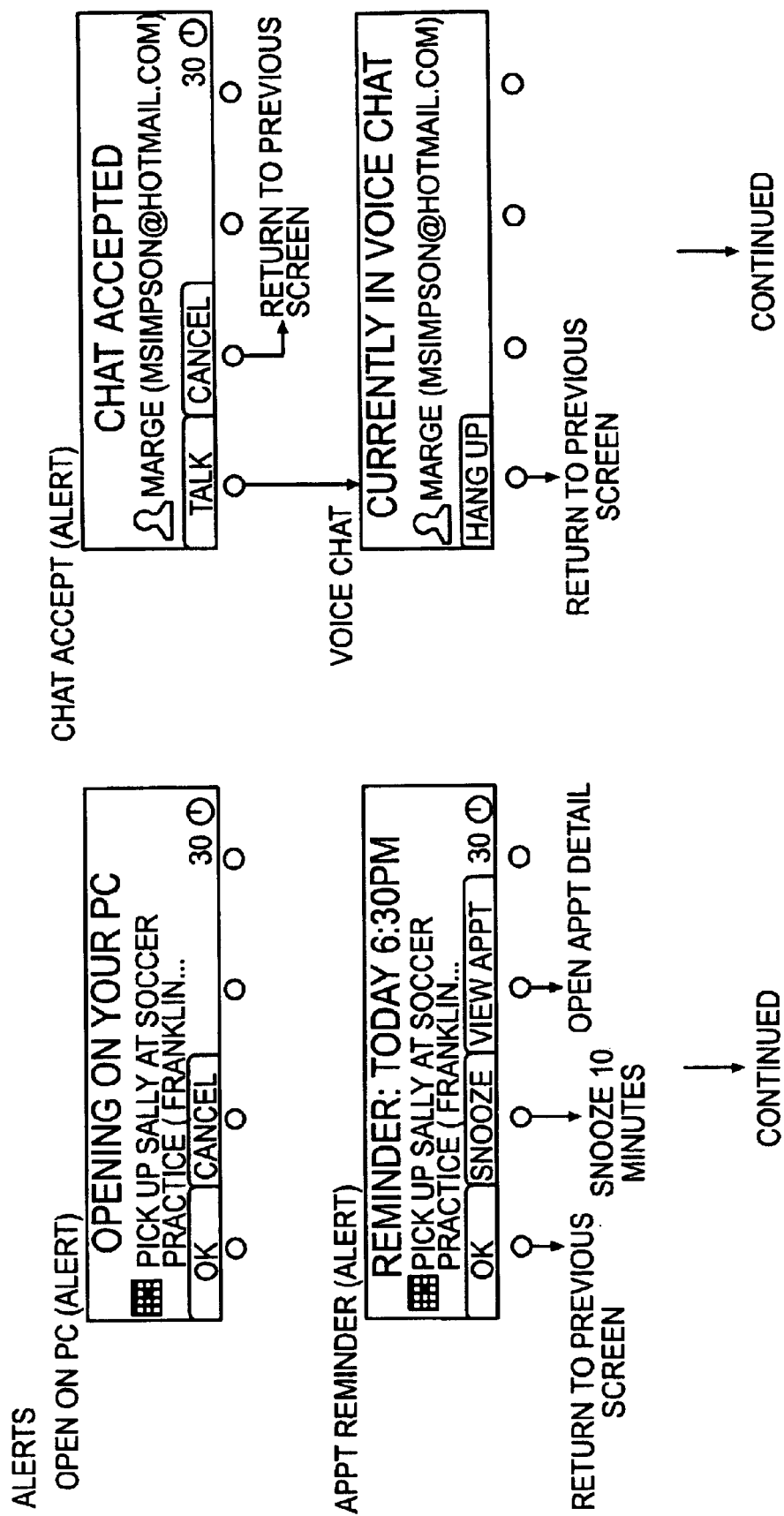
Figure 13A:
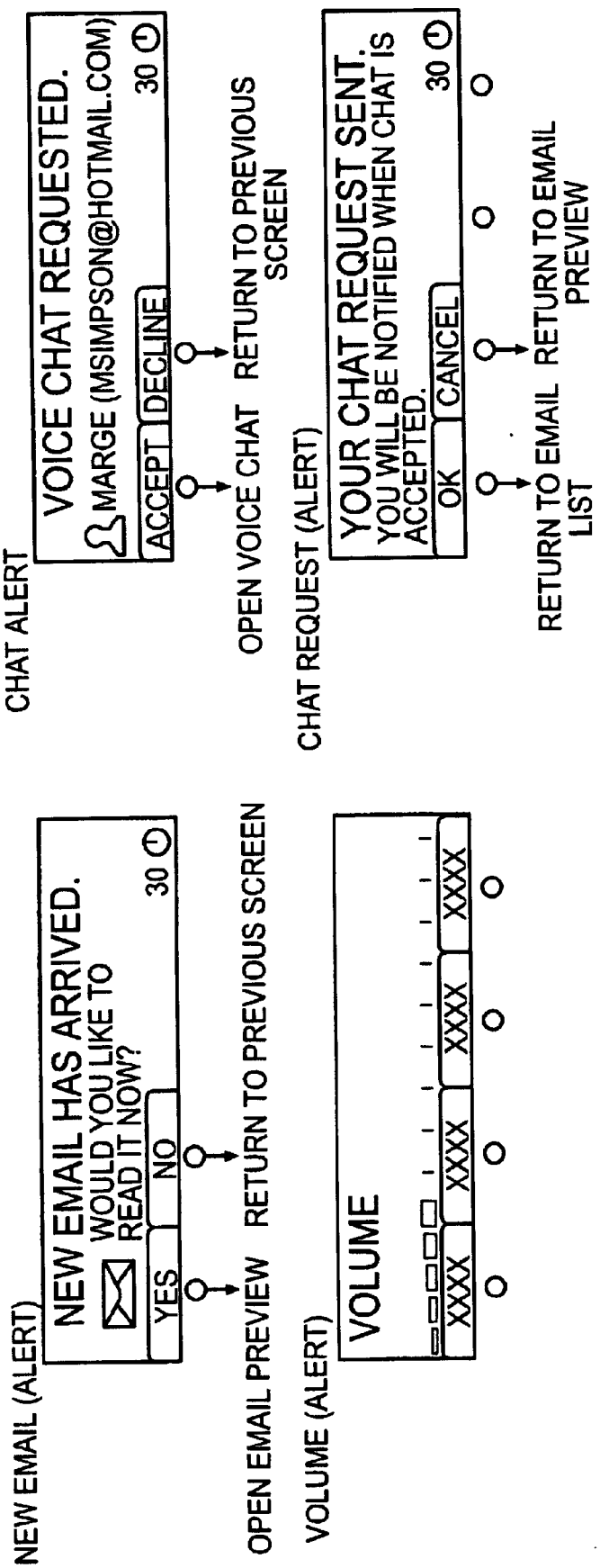
Figure 13C:
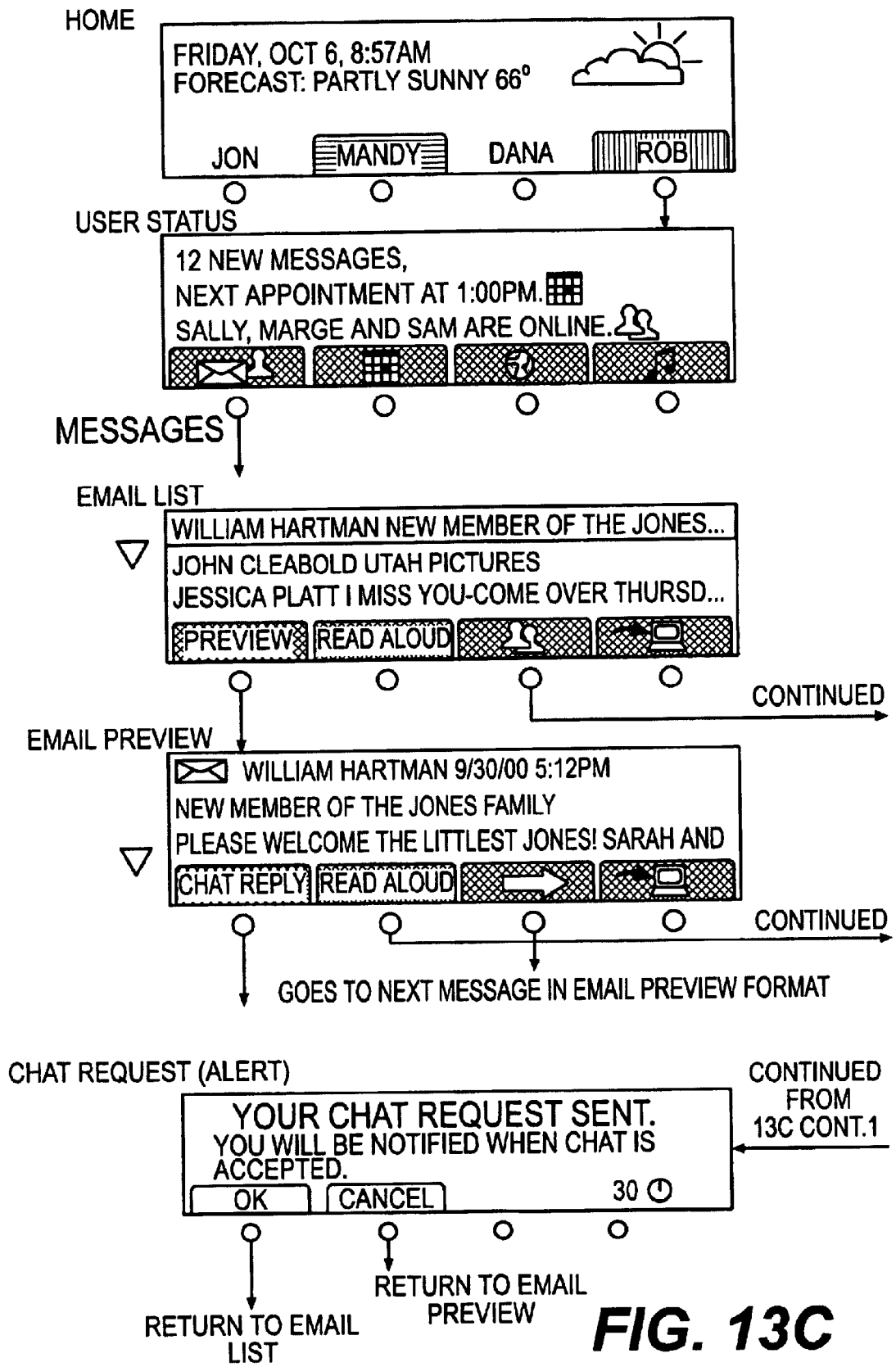
Figure 13E:
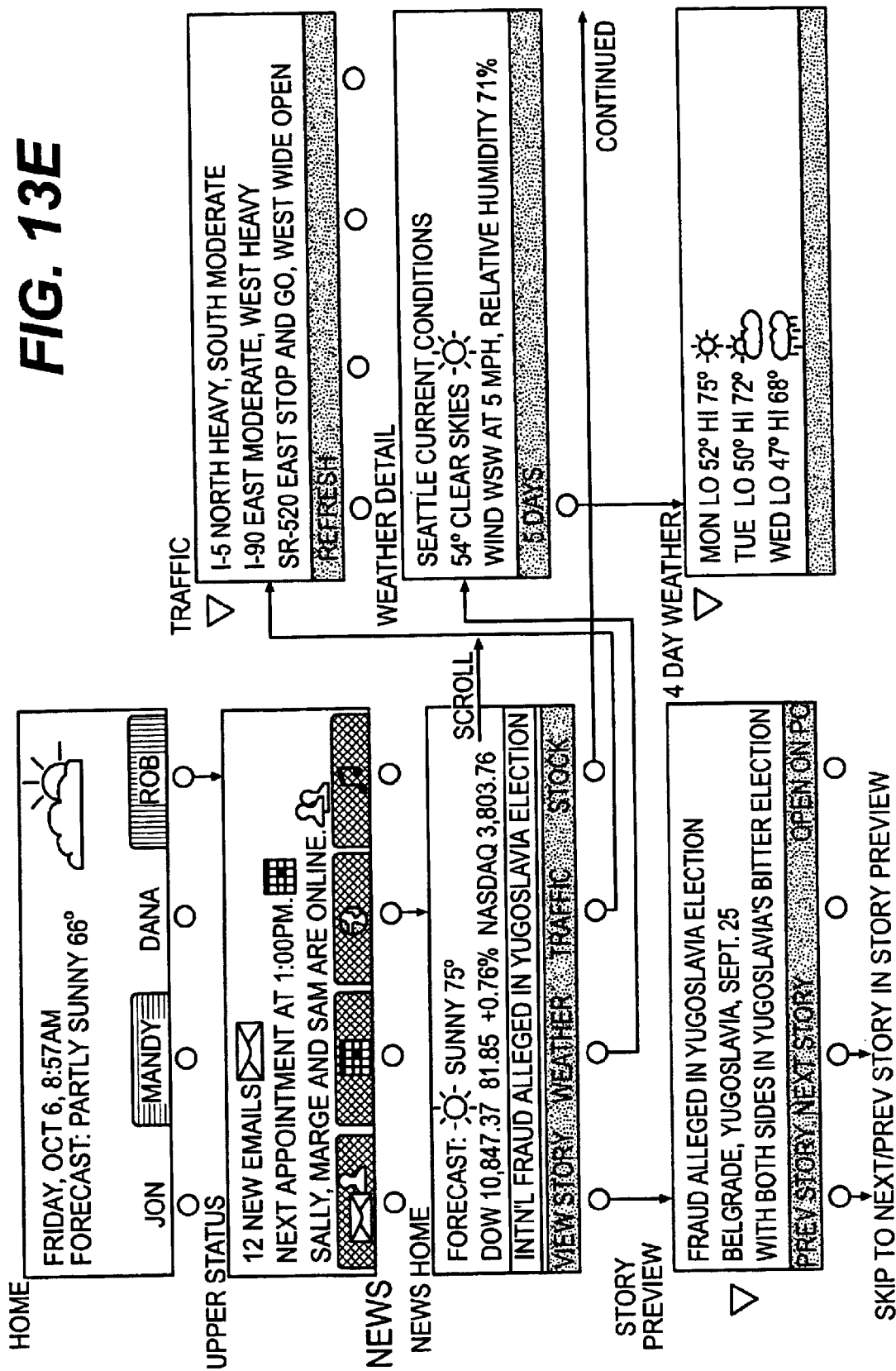
Figure 13E:
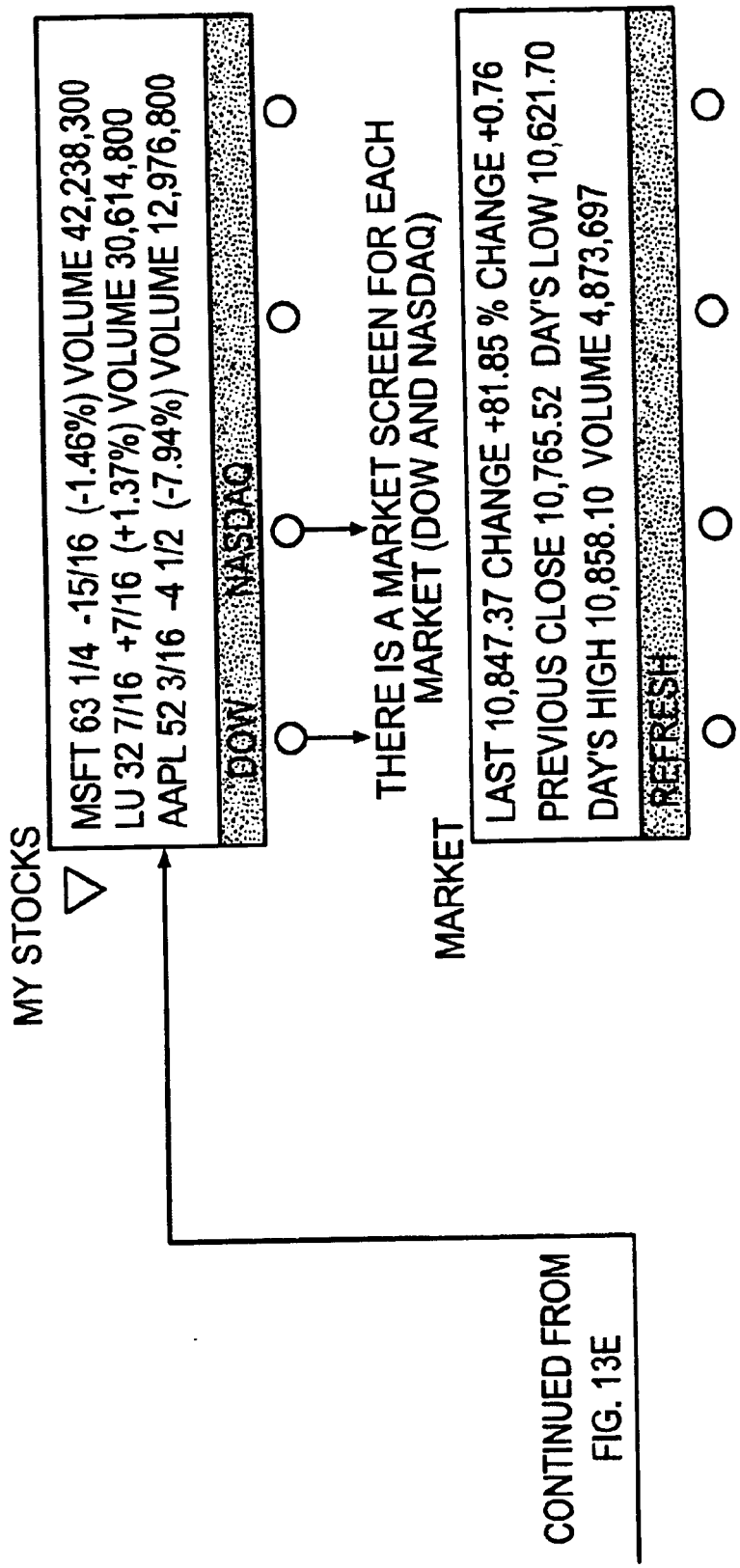

FIG. 13A depicts illustrative modal events such as email and appointment alerts, chat request alerts, and volume adjustment. Most modal events can be initiated by the occurrence of an event (e.g., a particular time of day, arrival of a new message, etc.) rather than by an action of the user. FIGS. 13B–13E represent activation of four different applications and illustrative flow sequences within those applications. FIG. 13B depicts the flows in the calendar application. FIG. 13C illustrates the flows in the messaging application including initiation of an online voice chat. To initiate an online voice chat with a person, according to one embodiment of the invention, they should be on the user's buddy list and online at the time. FIG. 13D represents flows for the music application. FIG. 13E shows an illustrative news application including weather, traffic and stock information.

Referring to FIG. 3, the display panel 324 of the control panel unit 307 may be set to receive display information that may have been part of the domain of the main display unit 207 in conventional computer system environments. For example, the responsibility for displaying information regarding separate applications (e.g., stock tickers, weather reports, and traffic reports) may be assigned to the display panel 324 of the control panel unit 307. Also, the control panel unit 307 could receive display information normally associated with the task bar, system and application messages and notification of events (e.g., time, power status, email and messaging notification, printer information, volume control, dialog box notifications of system events etc.) on the main display unit 307. According to another illustrative embodiment, by utilizing the buttons with the soft labels on the display panel, the control panel unit can function as the UI for Internet radio and television, video, "push information", an MP3 player or even become the hardware equivalent of a Windows Media Player distributed by Microsoft Corporation. The control panel unit UI may span from simple LED notifications to text-to-speech conversion of incoming email messages, to a full UI with a touch panel interface and a graphics picture frame.

A control panel unit may be responsible for a single or for multiple applications, system messages, notifications and the like. For example, an email, word processing or financial application may appear on the display panel of the control panel unit. Further, input from a user may be received from an input device coupled to the control panel unit, the host computer or both. The host computer can be configured manually or dynamically to route display functionality to the control panel unit. According to embodiments of the present invention, responsibility for an email application may be routed to one or more control panel units by default. A plurality of control panel units may display information for one user and/or one or more specific control panel units may be dedicated for displaying information for each user, that each user can have a separate PC companion control panel unit. In an illustrative implementation of the present invention, if a user were to insert a CD into the host computer, the host computer is configured to launch a soft UI applet and route the UI applet for display on the display panel of the control panel unit rather than the display screen of the main display unit.

An illustrative implementation of the control panel unit's communications with the host computer may be the same as the communications between the auxiliary display unit and host computer as described in the application entitled "Auxiliary Display Unit For a Computer System" assigned application Ser. No. 09/556,982 incorporated by reference herein. To control the control panel unit or module, the host computer CPU may communicate with a PIC (programmable integrated circuit) micro-controller chip located in the control panel unit. Locating a micro-controller chip in the control panel unit provides the ability to offload any processing overhead from the host computer. If a separate micro-controller is not used, then direct control of the control panel unit's display panel and buttons will be the responsibility of the host computer CPU.

In one embodiment the micro-chip controller may support several functions including seven momentary push-button switches; volume control; message notification light; IR blaster; hibernate mode/power mode LED (red/green states); and a motion sensor. Commands for controlling these functions and to report various states may be received and transmitted by way of a serial RS232 connector. The baud rate may be 57.6 Kbaud and the data format may be 8 bits, 1 STOP, no parity. It should be understood that computers might communicate with one another in a number of ways. While the implementation described herein includes a serial interface, other exemplary methods of interfacing could be via shared memory, using command blocks, or via USB protocols as a HID device. Firmware may be provided in the control panel unit to respond to commands from the host computer.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A control panel unit for a computer system comprising:
a display screen;
first and second button inputs, the first button input configured to display a first viewable state thereon and the second button input configured to display a second viewable state thereon, the first and second viewable states changing in response to actuation of said first button input, wherein the first and second viewable states are displayed outside of the display screen.

2. The control panel unit according to claim 1, wherein said display screen has first and second display regions for displaying first and second soft labels, respectively, said first and second soft labels being associated with said first and second button inputs, respectively, said first and second display regions being adjacent to said first and second button inputs, respectively, wherein said first and second soft labels change in response to actuation of said first button input.

3. The control panel unit according to claim 1, wherein the first viewable state displayed on the first button input is the same as the second viewable state displayed on the second button input, the first viewable state representing a first action associated with the first button input and the second viewable state representing a second action associated with second button input, the first and second actions being different.

4. The control panel unit according to claim 1, wherein said first and second viewable states represent first and second actions.

5. The control panel unit according to claim 4, wherein the first action includes launching an application when said first button input is actuated.

6. The control panel unit according to claim 5, wherein the application is a messaging, music, calendar or news application.

7. The control panel unit according to claim 5, wherein the application is launched on a computer coupled to said control panel unit.

8. The control panel unit according to claim 4, wherein the first and second actions represent responses to an alert.

9. The control panel unit according to claim 1, wherein said first button input includes at least one illuminable portion for defining the first viewable state.

10. The control panel unit according to claim 9, wherein said at least one illuminable portion is located on the periphery of said first button input.

11. The control panel unit according to claim 9, wherein said at least one illuminable portion is an icon located on a central portion of said first button input.

12. The control panel unit according to claim 1, wherein said first button input includes a portion configured to change color, the first viewable state including a particular color.

13. The control panel unit according to claim 12, wherein the color represents a specific user of the computer system.

14. The control panel unit according to claim 1, wherein responsive to actuation of said first button input or said second button input when data displayed on said display screen is selected, initiating an action associated with the data.

15. A control panel unit for a computer system comprising:
   a display having at least first and second display regions;
   at least first and second button inputs adjacent to said first and second display regions, respectively; and
   first and second soft labels displayed in said first and second display regions, respectively, said first and second soft labels associated with said first and second button inputs, respectively, at least one of said first soft label and said second soft label configured to change in response to actuation of said first button input in a first state,
   wherein said first and second soft labels respectively represent first and second users of the computer system.

16. The control panel unit according to claim 15, wherein said first and second soft labels and content on said display are displayed in a format associated with the first user in response to actuation of said first button input in the first state.

17. The control panel unit according to claim 15, wherein said first and second soft labels represent first and second applications associated with the first user in a second state responsive to said first button input being actuated in the first state.

18. The control panel unit according to claim 17, wherein at least one of the applications is a messaging, music, calendar or news application.

19. The control panel unit according to claim 15, wherein said first soft label changes appearance responsive to an event independent of actuation of said first button input.

20. The control panel unit according to claim 19, wherein the event includes receipt of an email message or a calendar event.

21. The control panel unit according to claim 15, wherein each of the first and second soft labels includes a color specifically associated with the user represented by the respective soft label.

22. The control panel unit according to claim 15, wherein responsive to actuation of said first button input in the first state, said first and second soft labels representing actions customized for the first user.

23. In a computer system having a display screen and at least one button input adjacent to the display screen, a method comprising the steps of:
   displaying a first button input in a first viewable state and a second button input in a second viewable state; and
   responsive to actuation of said first button input, changing the second viewable state of said second button input, wherein the first and second viewable states are displayed outside of the display screen.

24. The method according to claim 23, wherein the first viewable state represents an action.

25. The method according to claim 23, wherein the action represents a response to an alert.

26. The method according to claim 23, wherein the first viewable state represents an application.

27. The method according to claim 26, wherein the application is a messaging, music, calendar or news application.

28. The method according to claim 23, wherein the first and second viewable states represent first and second users of the computer system, respectively.

29. The method according to claim 23, wherein said step of changing the second viewable state includes the step of illuminating or de-illuminating a portion of said second button input.

30. The method according to claim 29, wherein said step of illuminating or de-illuminating includes illuminating or de-illuminating a peripheral portion of said second button input.

31. The method according to claim 29, wherein said step of changing the second viewable state includes the step of illuminating or de-illuminating an icon.

32. The method according to claim 23, wherein said step of changing the second viewable state label includes the step of changing a color of a portion of said second button input.

33. The method according to claim 23, further including the step of changing the first viewable state of said first button input responsive to actuation of said first button input.

34. The method according to claim 33, wherein the first and second viewable states represent first and second actions.

35. The method according to claim 34, further comprising the step of initiating the first action in response to actuation of said first button input.

36. The method according to claim 23, further including the steps of:
- displaying a first soft label in a first display region of the display screen located adjacent to said first button input, the first soft label representing a current context of said first button input; and
- displaying a second soft label in a second display region of the display screen located adjacent to said second button input, the second soft label representing a current context of said second button input.

37. The method according to claim 36, further including the step of changing the first soft label and the second soft label responsive to actuation of said first button input.

38. The method according to claim 36, further including the steps of:
- displaying data in a third display region of the display screen, and
- in response to actuation of said first button input or said second button input when data displayed on said display screen is selected, initiating an action associated with the data represented by said first soft label or said second soft label.

39. The method according to claim 38, wherein the action includes receiving data from the Internet.

40. In a computer system having at least first and second display regions, and at least first and second button inputs associated with said first and second display regions, respectively, a method comprising the steps of:
- displaying first and second soft labels in said first and second display regions, respectively, the first and second soft labels associated with said first and second button inputs, respectively; and
- responsive to actuation of said first button input, changing at least one of the first soft label and the second soft label, wherein in a first state said first and second soft labels respectively represent first and second users of the computer system.

41. The method according to claim 40, further comprising the step of displaying the first and second soft labels and content in a format associated with the first user responsive to actuation of said first button input in the first state.

42. The method according to claim 40, wherein the first and second soft labels represent first and second applications associated with the first user in a second state responsive to said first button input being actuated in the first state.

43. The method according to claim 42, further comprising the step of initiating one of the first application and second application, in response to actuation of one of said first button input and second button input, respectively, in the second state.

44. The method according to claim 43, further comprising the step of changing the first and second soft labels in response to actuation of said first button input in the second state, the first and second soft labels representing actions associated with the initiated application in a third state.

45. The method according to claim 40, further comprising the step of changing the appearance of the first soft label responsive to event independent of actuation of said first button input.

46. The method according to claim 45, wherein the event includes receipt of an email message.

47. The method according to claim 45, wherein the event includes occurrence of a calendar event.

48. The method according to claim 42, wherein one of the first and second applications represents a messaging, music, calendar or audio application.

49. The method according to claim 40, wherein each of the first and second soft labels includes a color specifically associated with the user represented by the respective soft label.

50. The method according to claim 49, further comprising displaying the first and second soft labels in the same color responsive to actuation of the first button input in the first state, the color being specifically associated with the first user.

51. In a computer system having at least first and second display regions, and at least first and second button inputs associated with said first and second display regions, respectively, a method comprising the steps of:
- displaying first and second soft labels in said first and second display regions, respectively, the first and second soft labels associated with said first and second button inputs, respectively; and
- responsive to actuation of said first button input, changing the first soft label in said first display region associated with said first button input, and initiating an action involving receiving information via the Internet.

52. The method according to claim 51, wherein the information includes news.

53. The method according to claim 51, wherein the information includes stock information, sports information, weather information or traffic information.

54. The method according to claim 51, wherein the information includes an online chat request.

55. The method according to claim 40, wherein the first and second soft labels represent actions in an alert screen associated with the first user in a second state responsive to said first button input being actuated in the first state.

56. The method according to claim 55 wherein the alert screen provides a notification message in a third display region.

57. The method according to claim 55, wherein the alert screen provides a message related to status of the computer system.

* * * * *